(12) United States Patent
Chang et al.

(10) Patent No.: US 12,541,940 B2
(45) Date of Patent: Feb. 3, 2026

(54) VISUAL ATTENTION TRACKING USING GAZE AND VISUAL CONTENT ANALYSIS

(71) Applicants: The Regents of the University of Michigan, Ann Arbor, MI (US); Yuhu Chang, Ann Arbor, MI (US); Yingying Zhao, Ann Arbor, MI (US); Qin Lv, Ann Arbor, MI (US); Li Shang, Ann Arbor, MI (US)

(72) Inventors: Yuhu Chang, Shanghai (CN); Yingying Zhao, Shanghai (CN); Qin Lv, Boulder, CO (US); Robert P. Dick, Chelsea, MI (US); Li Shang, Shanghai (CN)

(73) Assignee: The Regents of the University of Michigan, Ann Arbor, MI (US)

( * ) Notice: Subject to any disclaimer, the term of this patent is extended or adjusted under 35 U.S.C. 154(b) by 490 days.

(21) Appl. No.: 17/952,810

(22) Filed: Sep. 26, 2022

(65) Prior Publication Data

US 2023/0133579 A1    May 4, 2023

Related U.S. Application Data

(60) Provisional application No. 63/247,893, filed on Sep. 24, 2021.

(51) Int. Cl.
*G06V 10/25* (2022.01)
*G02B 27/01* (2006.01)
(Continued)

(52) U.S. Cl.
CPC ......... *G06V 10/25* (2022.01); *G02B 27/0172* (2013.01); *G06F 3/013* (2013.01);
(Continued)

(58) Field of Classification Search
CPC ........ G06V 20/10; G06V 10/25; G06V 10/20; G06V 20/20
See application file for complete search history.

(56) References Cited

U.S. PATENT DOCUMENTS 10,685,488 B1 * 6/2020 Kumar ................... A61H 23/04
2015/0070386 A1 * 3/2015 Ferens ................... G06F 3/013
345/633

(Continued)

FOREIGN PATENT DOCUMENTS

CN         112507799 A  *  3/2021  ............. G06F 3/013
WO   WO-2017209978 A1 * 12/2017  ............. G06F 3/013

OTHER PUBLICATIONS

Krafka et al., Eye Tracking for Everyone, IEEE Conference on Computer Vision and Pattern Recognition (CVPR), 2016, pp. 1-9, AAPA furnished via IDS.*

(Continued)

*Primary Examiner* — Guillermo M Rivera-Martinez
(74) *Attorney, Agent, or Firm* — Lempia Summerfield Katz LLC

(57) ABSTRACT

A method for detecting content of interest to a user includes obtaining a first data stream indicative of eye movement and/or gaze direction of the user as the user is viewing a scene in a field of view of the user, obtaining a second data stream indicative of visual content in the field of view of the user, determining, based on the first data stream and the second data stream, that content of interest to the user is present in the scene in the field of view of the user, and, in response to determining that content of interest to the user is present in the scene in the field of view of the user, triggering, with the processor, an operation to be performed with respect to the scene in the field of view of the user.

19 Claims, 12 Drawing Sheets

(51) Int. Cl.

| | |
|---|---|
| *G06F 3/01* | (2006.01) |
| *G06V 10/44* | (2022.01) |
| *G06V 10/80* | (2022.01) |
| *G06V 10/82* | (2022.01) |
| *G06V 40/19* | (2022.01) |

(52) U.S. Cl.
CPC ............ *G06V 10/44* (2022.01); *G06V 10/806* (2022.01); *G06V 10/82* (2022.01); *G06V 40/19* (2022.01); *G02B 2027/0178* (2013.01)

(56) References Cited

U.S. PATENT DOCUMENTS

| | | | | |
|---|---|---|---|---|
| 2016/0217327 | A1* | 7/2016 | Osterhout | H04N 23/55 |
| 2017/0293356 | A1* | 10/2017 | Khaderi | A61B 3/113 |
| 2017/0347039 | A1* | 11/2017 | Baumert | H04N 5/265 |
| 2018/0224658 | A1* | 8/2018 | Teller | G06F 3/011 |
| 2018/0232575 | A1* | 8/2018 | Strombom | A61B 3/113 |
| 2018/0261253 | A1* | 9/2018 | Gilson | H04N 9/87 |
| 2019/0179423 | A1* | 6/2019 | Rose | G02B 27/0172 |
| 2019/0286227 | A1* | 9/2019 | Samadani | G06F 3/017 |
| 2019/0371075 | A1* | 12/2019 | Stafford | G06F 3/0482 |
| 2019/0391638 | A1* | 12/2019 | Khaderi | A63F 13/212 |
| 2020/0034617 | A1* | 1/2020 | Croxford | G06V 40/19 |
| 2020/0081524 | A1* | 3/2020 | Schmidt | G06F 3/013 |
| 2020/0103967 | A1* | 4/2020 | Bar-Zeev | G06F 3/04842 |
| 2020/0128232 | A1* | 4/2020 | Hwang | A61B 5/0022 |
| 2020/0348515 | A1* | 11/2020 | Peuhkurinen | G02B 27/0172 |
| 2020/0380767 | A1* | 12/2020 | Xu | H04N 21/4223 |
| 2021/0258554 | A1* | 8/2021 | Bruls | H04N 13/366 |
| 2021/0373656 | A1* | 12/2021 | Watola | G06F 1/163 |

OTHER PUBLICATIONS

Silva et al., Leveraging Eye-gaze and Time-series Features to Predict User Interests and Build a Recommendation Model for Visual Analysis, ETRA '18: Proceedings of the 2018 ACM Symposium on Eye Tracking Research & Applications, Article No. 13,pp. 1-9, doi.org/10.1145/3204493.320, AAPA furnished via IDS.*

Alam et al., Analyzing Eye-Tracking Information in Visualization and Data Space: From Where on the Screen to What on the Screen , in IEEE Transactions on Visualization and Computer Graphics, vol. 23, No. 5, pp. 1492-1505, May 1, 2017, doi: 10.1109/TVCG.2016.2535340.*

Feng et al., Low-Cost Eye Gaze Prediction System for Interactive Networked Video Streaming, in IEEE Transactions on Multimedia, vol. 15, No. 8, pp. 1865-1879, Dec. 2013, doi: 10.1109/TMM.2013. 2272918.*

Katti et al., Online Estimation of Evolving Human Visual Interest, ACM Transactions on Multimedia Computing, Communications, and Applications (TOMM), vol. 11, Issue 1, Article No. 8, pp. 1-21, Sep. 2014, doi.org/10.1145/2632284.*

E. S. Lubana and R. P. Dick; Digital Foveation: an energy-aware machine vision framework; IEEE Trans. on Computer-Aided Design, pp. 2371-2380, Nov. 2018.

A. Torralba and P. Sinha; Statistical context priming for object detection; Proceedings Eighth IEEE International Conference on Computer Vision. ICCV 2001, pp. 763-770.

Ambarella introduces CV28M SoC with CVflow to enable new categories of intelligent sensing devices; Ambarella; 2020; https://www.ambarella.com; 5 pp.

Andrew Howard et al.; Searching for MobileNetV3; Proceedings of the IEEE International Conference on Computer Vision; 2019; pp. 1314-1324.

Benjamin Tag et al., Facial Thermography for Attention Tracking on Smart Eyewear: An Initial Study. Proceedings of the 2017 CHI Conference Extended Abstracts on Human Factors in Computing Systems; May 2017; pp. 2959-2966.

Broadbent, D.E.; A mechanical model for human attention and immediate memory; Psychological Review vol. 64, 3; 1957; pp. 205-215.

Cherlynn Low; Google Clips review: A smart, but unpredictable camera; https://www.engadget.com/2018-02-27-google-clips-ai-camera-review.html; 2018; 13 pp.

Dan Witzner Hansen and Qiang Ji; In the eye of the beholder: A survey of models for eyes and gaze; IEEE transactions on pattern analysis and machine intelligence, vol. 32, 3; 2009, pp. 478-500.

Dario Cazzato, Marco Leo, Cosimo Distante, and Holger Voos; When I Look into Your Eyes: A Survey on Computer Vision Contributions for Human Gaze Estimation and Tracking; Sensors vol. 20, 13; 2020, pp. 1-42.

Dario D Salvucci and Joseph H Goldberg; Identifying fixations and saccades in eye-tracking protocols; Proceedings of the 2000 symposium on Eye tracking research & applications; ACM, 2020; pp. 71-78.

E. Chong, Y. Wang, N. Ruiz, and J. M. Rehg; Detecting Attended Visual Targets in Video; In 2020 IEEE/CVF Conference on Computer Vision and Pattern Recognition (CVPR); 2020; pp. 5395-5405.

Fakta Jain, Yaser Sheikh, Ariel Shamir, and Jessica Hodgins; Gaze-driven video re-editing; ACM Transactions on Graphics vol. 34, 2; 2015, pp. 1-12.

En Teng Wong et al.; Gaze Estimation Using Residual Neural Network; 2019 IEEE International Conference on Pervasive Computing and Communications Workshops (PerCom Workshops); IEEE, 2019; pp. 411-414.

Enkelejda Tafaj, Gjergji Kasneci, Wolfgang Rosenstiel, and Martin Bogdan; Bayesian Online Clustering of Eye Movement Data; Proceedings of the Symposium on Eye Tracking Research and Applications (ETRA '12); 2012, pp. 285-288.

Enkelejda Tafaj, Thomas C. Kübler, Gjergji Kasneci, Wolfgang Rosenstiel, and Martin Bogdan; Online Classification of Eye Tracking Data for Automated Analysis of Traffic Hazard Perception; Proceedings of the 23rd International Conference on Artificial Neural Networks and Machine Learning—ICANN 2013; 2013, pp. 442-450.

Erroll Wood and Andreas Bulling; Eyetab: Model-based gaze estimation on unmodified tablet computers; Proceedings of the Symposium on Eye Tracking Research and Applications; 2014; pp. 207-210.

G. Huang, Z. Liu, K. Q. Weinberger, and L. van derMaaten; Densely connected convolutional network; Proceedings of the IEEE Conference on Computer Vision and Pattern Recognition (CVPR), 2017; pp. 4700-4708.

Grace W Lindsay; Attention in Psychology, Neuroscience, and Machine Learning; Frontiers in Computational Neuroscience vol. 14, 29; 2020; pp. 1-21.

He et al., "Deep Residual Learning for Image Recognition", The IEEE Conference on Computer Vision and Pattern Recognition, 2016, pp. 770-778.

Jeremiah W Johnson; Adapting mask-rcnn for automatic nucleus segmentation; 2018; arXiv preprint arXiv:1805.00500; pp 1-7.

Kang Wang, Hui Su, and Qiang Ji; Neuro-inspired Eye Tracking with Eye Movement Dynamics; Proceedings of the IEEE conference on computer vision and pattern recognition; 2019; pp. 9831-9840.

Kang Wang, Rui Zhao, Hui Su, and Qiang Ji; Generalizing eye tracking with bayesian adversarial learning; Proceedings of the IEEE Conference on Computer Vision and Pattern Recognition; 2019; pp. 11907-11916.

Katharina Anton-Erxleben and Marisa Carrasco; Attentional enhancement of spatial resolution: linking behavioural and heurophysiological evidence; Nature Reviews Neuroscience vol. 14, 3; 2013, pp. 188-200.

Kingma, Diederik P., and Jimmy Ba; "Adam: A Method for Stochastic Optimization." arXiv:1412.6980 [Cs], Dec. 22, 2014. http://arxiv.org/abs/1412.6980; 9 pp.

Kyle Krafka et al., Eye tracking for everyone; Proceedings of the IEEE conference on computer vision and pattern recognition; 2016; pp. 2176-2184.

Laxmidhar Behera, Indrani Kar, and Avshalom C Elitzur; A recurrent quantum neural network model to describe eye tracking of moving targets; Foundations of Physics Letters, vol. 18, 4; 2005; pp. 357-370.

(56) References Cited

OTHER PUBLICATIONS

Linjie Yang, Yuchen Fan, and Ning Xu; Video instance segmentation; Proceedings of the IEEE International Conference on Computer Vision; 2019; pp. 5188-5197.

Marisa Carrasco; Visual attention: The past 25 years; Vision Research vol. 51, 13; 2011; pp. 1484-1525.

Mark Sandler et al., MobileNetV2: Inverted residuals and linear bottlenecks; Proceedings of the IEEE Conference on Computer Vision and Pattern Recognition; 2018; pp. 4510-4520.

Mikhail Startsev, Ioannis Agtzidis, and Michael Dorr; 1D CNN with BLSTM for automated classification of fixations, saccades, and smooth pursuits; Behavior Research Methods vol. 51, 2; 2019; pp. 556-572.

Moritz Kassner, William Patera, and Andreas Bulling; Pupil: an open source platform for pervasive eye tracking and mobile gaze-based interaction; Proceedings of the 2014 ACM international joint conference on pervasive and ubiquitous computing: Adjunct publication; 2014; pp. 1151-1160.

Nelson Silva et al., Leveraging Eye-Gaze and Time-Series Features to Predict User Interests and Build a Recommendation Model for Visual Analysis; Proceedings of the 2018 ACM Symposium on Eye Tracking Research & Applications (ETRA '18); 2018; pp. 1-9.

Oleg V Komogortsev et al., Qualitative and quantitative scoring and evaluation of the eye movement classification algorithms; Proceedings of the 2010 Symposium on Eye-Tracking Research & Applications; ACM, 2010; pp. 65-68.

Rachavarapu, Kranthi Kumar et al., Watch to Edit: Video Retargeting using Gaze; Computer Graphics Forum vol. 37, 2, 2018; pp. 205-215.

Raimondas Zemblys, Diederick C. Niehorster, Kenneth Holmqvist; gazeNet: End-to-end eye-movement event detection with deep neural networks; Behavior Research Methods vol. 51; 2019; pp. 840-864.

Shagen Djanian; Eye Movement Classification Using Deep Learning; Master Thesis. Department of Vision, Graphics and Interactive Systems, Aalborg University, 2019; 82 pp.

Shaoqing Ren, Kaiming He, Ross Girshick, and Jian Sun; Faster r-cnn: Towards real-time object detection with region proposal networks; Advances in Neural Information Processing Systems 28 (NIPS), 2015; pp. 91-99.

Shuo Wang et al., Atypical visual saliency in autism spectrum disorder quantified through model-based eye tracking; Neuron vol. 88, 3; 2015; pp. 604-616.

Sophie Marat et al., Modelling spatio-temporal saliency to predict gaze direction for short videos; International Journal of Computer Vision vol. 82, 3; 2009; pp. 231-243.

Thiago Santini, Wolfgang Fuhl, Thomas Kubler, and Enkelejda Kasneci; Bayesian identification of fixations, saccades, and smooth pursuits; Proceedings of the Ninth Biennial ACM Symposium on Eye Tracking Research & Applications; 2016; pp. 163-170.

Trixie A Katz et al., Visual attention on a respiratory function monitor during simulated neonatal resuscitation: an eye-tracking study; Archives of Disease in Childhood-Fetal and Neonatal Edition vol. 104, 3, 2019, pp. 1-6.

Vannevar Bush; As we may think; The Atlantic Monthly, vol. 176, 1; 1945, pp. 101-108.

Wenguan Wang et al., Learning unsupervised video object segmentation through visual attention; Proceedings of the IEEE conference on computer vision and pattern recognition; 2019; pp. 3064-3074.

Xucong Zhang, Yusuke Sugano, and Andreas Bulling; Evaluation of Appearance-Based Methods and Implications for Gaze-Based Applications; Proceedings of the 2019 CHI Conference on Human Factors in Computing Systems; ACM, 2019; 13 pp.

Xucong Zhang, Yusuke Sugano, and Andreas Bulling; Revisiting Data Normalization for Appearance-Based Gaze Estimation; Proceedings of the International Symposium on Eye Tracking Research and Applications (ETRA); 2018; pp. 1-9.

Xucong Zhang, Yusuke Sugano, Mario Fritz, and Andreas Bulling; MPIIGaze: Real-world dataset and deep appearance-based gaze estimation; IEEE Transactions on Pattern Analysis and Machine Intelligence vol. 41, 1; 2019, pp. 162-175.

Yingying Zhao et al., A Reinforcement-Learning-Based Energy-Efficient Framework for Multi-Task Video Analytics Pipeline; IEEE Transactions on Multimedia vol. 24; 2021; 14 pp; arXiv:2104.04443.

Yomna Abdelrahman et al.; Classifying attention types with thermal imaging and eye tracking; Proceedings of the ACM on Interactive, Mobile, Wearable and Ubiquitous Technologies; vol. 3, 3; 2019; pp. 1-27.

Yoon Min Hwang and Kun Chang Lee; Using an eye-tracking approach to explore gender differences in visual attention and shopping attitudes in an online shopping environment; International Journal of Human-Computer Interaction vol. 34, 1 (2018), pp. 15-24.

Yujiang Wang et al., Dynamic Face Video Segmentation via Reinforcement Learning; Proceedings of the IEEE/CVF Conf. on Computer Vision and Pattern Recognition; 2020; pp. 6959-6969.

* cited by examiner

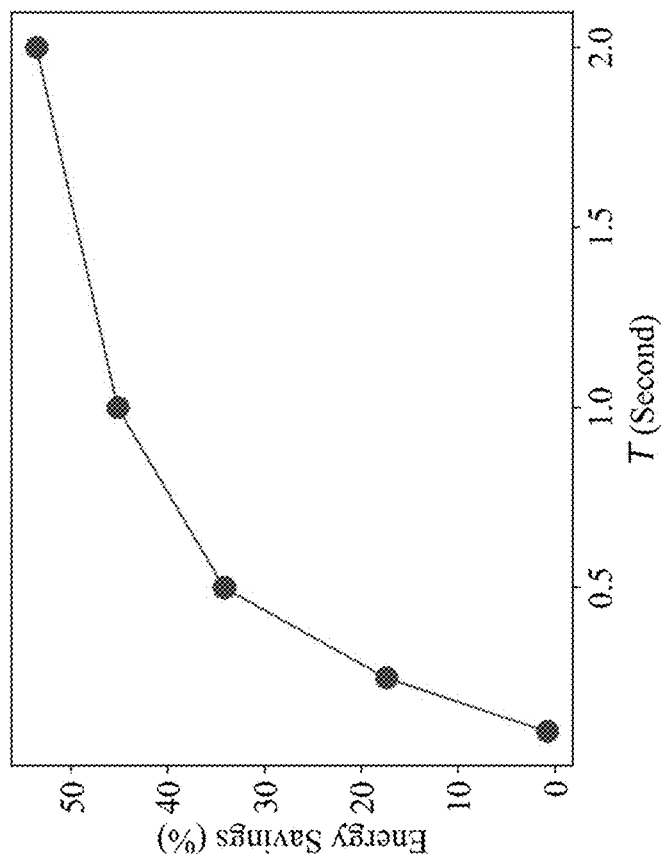
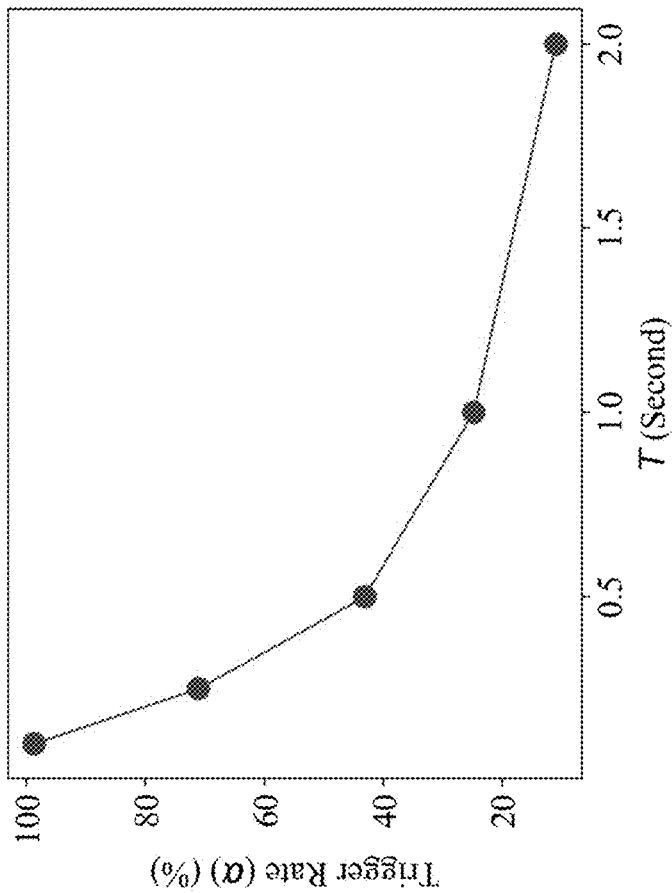
FIG. 8B
FIG. 8A

VISUAL ATTENTION TRACKING USING GAZE AND VISUAL CONTENT ANALYSIS

CROSS-REFERENCE TO RELATED APPLICATION

This application claims the benefit of U.S. provisional application entitled "MemX: An Attention-Aware Smart Eyewear System for Personalized Moment Auto-Capture," filed Sep. 24, 2021 and assigned Ser. No. 63/247,893, the entire disclosure of which is hereby expressly incorporated by reference.

BACKGROUND OF THE DISCLOSURE

Field of the Disclosure

The disclosure relates generally to tracking human attention to visual content in a field of view of the user.

Brief Description of Related Technology

Visual content recording and generation is used in many systems and applications, such as for capturing users' experiences in everyday life. Such systems may utilize wearable cameras or other wearable equipment to capture, save and/or provide a visual display of visual content that may be viewed by a user. Typically, visual content capture or generation requires manual intervention of the user for content recording or generation that may be of interest to the user. In some systems, visual content analysis and content identification is used to determine potential content of interest in an image or video stream depicting a scene in a field of view of the user. Visual content analysis is thus utilized in some current systems to auto-capture content that may be deemed to be of interest to the user. Such typical auto-capture systems, however, lack personalization to the user, providing a one-size-fits-all type solution for auto-capture of content for all users. Moreover, visual content analysis is generally computationally intensive and energy intensive and thus is often not suitable or very limited for resource-constrained platforms, such as systems having energy-constrained wearable form factor.

Eye-tracking is another technique that has been utilized to identify content that may be of interest in a field of view of a user. Typical eye tracking systems, however, suffer from limitations that complicate their practical use. Generally, eye tracking does not directly detect the object of human visual interest. Instead, eye tracking systems estimate human visual regional focus by measuring the angular direction of eye gaze relative to the field of view of the user. Measurement noise, e.g., angular offset and head motion, often produce incorrect visual attention measurements. In addition, typical eye movement is noisy. Human gaze frequently experiences transient jitter: gaze may drift away from the object of interest due to other visual stimuli or noise. Therefore, typical eye tracking systems are often inadequate for reliable visual attention tracking and identification of content that may be of interest to a user.

SUMMARY OF THE DISCLOSURE

In accordance with one aspect of the disclosure, a method for detecting content of interest to a user includes obtaining, by a processor, a first data stream indicative of one or both of i) eye movement and ii) gaze direction of the user as the user is viewing a scene in a field of view of the user, obtaining, by the processor, a second data stream indicative of visual content in the field of view of the user, determining, by the processor, based on the first data stream and the second data stream, that content of interest to the user is present in the scene in the field of view of the user, and, in response to determining that content of interest to the user is present in the scene in the field of view of the user, triggering, with the processor, an operation to be performed with respect to the scene in the field of view of the user.

In accordance with another aspect of the disclosure, a method for tracking visual attention of a user includes obtaining, by a processor, a first data stream indicative of one or both of i) eye movement and ii) gaze direction of the user as the user is viewing a scene in a field of view of the user, obtaining, by the processor, a second data stream indicative of visual content in the field of view of the user, using a unified neural network to detect, by the processor, based on the first data stream and the second data stream, that visual attention of the user is directed to an object within the scene, and, in response to determining, that visual attention of the user is directed to an object within the scene, triggering, recording of a video snippet capturing the scene.

In accordance with yet another aspect of the disclosure, a system comprises a first sensor configured to generate data indicative of one or both of i) eye movement and ii) gaze direction of a user as the user is viewing a scene in a field of view of the user, a second sensor configured to generate data indicative of visual content in the field of view of the user, and a processor configured to obtain, from the first sensor, a first data stream indicative of the one or both of i) eye movement and ii) gaze direction of the user as the user is viewing the scene, obtain, from the second sensor, a second data stream indicative of visual content in the field of view of the user, determine, based on the first data stream and the second data stream, that content of interest to the user is present in the scene in the field of view of the user, and, in response to determining that content of interest to the user is present in the scene, triggering, with the processor, an operation to be performed with respect to the scene.

In connection with any one of the aforementioned aspects, the devices and/or methods described herein may alternatively or additionally include or involve any combination of one or more of the following aspects or features. The method further includes analyzing, by the processor, the first data stream prior to obtaining the second data stream, based on analyzing the first data stream, detecting, by the processor, that visual attention of the user is focused on a region within the scene, and in response to detecting that visual attention of the user is focused on the region within the scene, triggering capture of the second data stream to capture visual content in the field of view of the user. Analyzing the first data stream includes detecting a change in eye movement of the user as the user is viewing the scene, wherein the change in eye movement indicates that the visual attention of the user is focused on the region within the scene. Detecting the change in the eye movement of the user as the user is viewing the scene includes detecting saccade to smooth pursuit transitions in eye gaze of the user. Detecting that content of interest to the user is present in the scene in the field of view of the user includes performing a unified analysis of the first data stream and the second data stream by a temporal visual analysis network. Performing the unified analysis of the first data stream and the second data stream by the temporal visual analysis network includes extracting a set of gaze features from the first data stream, concurrently with extracting the set of gaze features from the first data stream, extracting a set of scene features from the second data stream, fusing the set of gaze features with the set of scene features to generate a fused set of features, and detecting, based on the fused set of features, that content of interest to the user is present in the scene in the field of view of the user. The method further includes extracting, by the processor, from the first data stream, a likelihood of historical eye movement types, and detecting a saccade-smooth pursuit transition in the gaze of the user based at least in part on the likelihood of eye movement types. The method further includes extracting, by the processor, historical gaze positions from the set of gaze features, and detecting the saccade-smooth pursuit transition in the gaze of the user further based on determining that a majority of the historical gaze positions fall within a region in the scene. The method further includes, in response to detecting the saccade-smooth pursuit transition, triggering, with the processor, capture of the second data stream to capture visual content in the field of view of the user. Detecting the saccade-smooth pursuit transition includes detecting the saccade-smooth pursuit transition for a pre-determined period of time prior to triggering capture of the second data stream to capture visual content in the field of view of the user. Determining that content of interest to the user is present in the scene includes determining that visual attention of the user is directed to an object in the scene. Triggering the operation to be performed with respect to the scene in the field of view of the user includes triggering recording of a video snippet capturing the scene in the field of view of the user. Triggering recording of the video snippet capturing the scene in the field of view of the user comprises triggering the recording to be performed for a predetermined duration of time. The first sensor and second sensor are mounted to a frame of smart eyewear to be worn by the user. The first sensor is configured as an inward-facing camera facing eyes of the user when the user wears the smart eyewear. The second sensor is configured as a forwarding-facing camera with respect to the field of view of the user when the user wears the smart eyewear. A first resolution of the inward-facing camera is lower than a second resolution of the forwarding-facing camera. The processor is further configured to prior to obtaining the second data stream, analyze the first data stream, obtained from the inward-facing camera, based on analyzing the first data stream, detecting that visual attention of the user is focused on a particular region within the scene, and, in response to detecting that visual attention of the user is focused on a particular region within the scene, trigger capture of the second data stream to capture visual content in the field of view of the user. The processor is configured to extract a set of gaze features from the first data stream, concurrently with extracting the set of gaze features from the first data stream, extract a set of scene features from the second data stream, fuse the set of gaze features with the set of scene features to generate a fused set of features, and detect, based on the fused set of features, that content of interest to the user is present in the scene in the field of view of the user.

BRIEF DESCRIPTION OF THE DRAWING FIGURES

For a more complete understanding of the disclosure, reference should be made to the following detailed description and accompanying drawing figures, in which like reference numerals identify like elements in the figures.

FIG. 8A depicts the impact of a duration of time T, for which a potential smooth pursuit phase is to be detected using eye tracking before triggering high-precision attention tracking, on the trigger rate a of the disclosed system in accordance with an example.

FIG. 8B shows the impact of the impact of a duration of time T, for which a potential smooth pursuit phase is to be detected using eye tracking before triggering high-precision attention tracking, on the energy consumption of attention detection in the disclosed system in accordance with an example.

Figure 1:
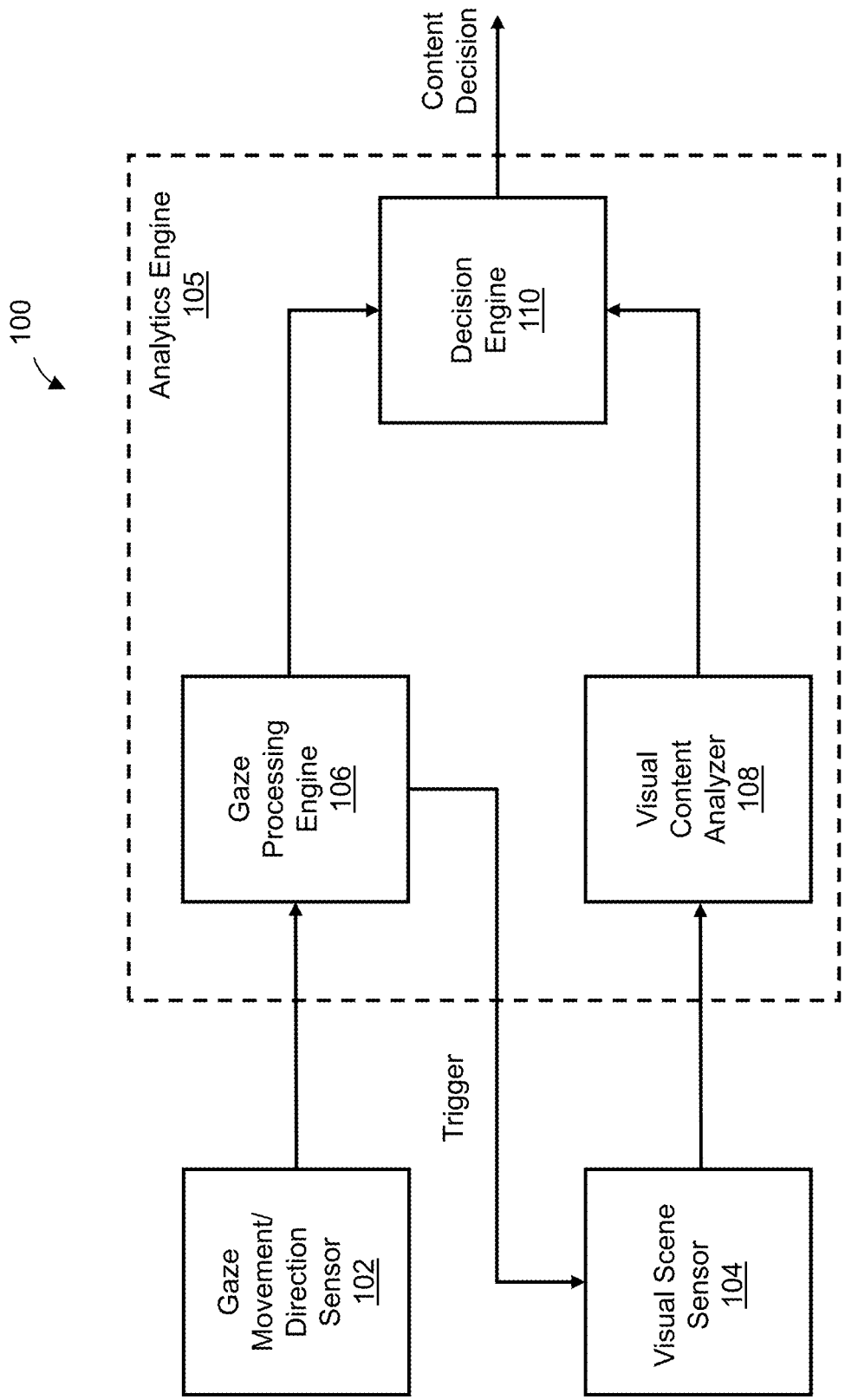
FIG. 1 is a block diagram of an example system configured to identify salient content of interest to a user in visual content in a field of field of the user in accordance with an example.

The embodiments of the disclosed systems and methods may assume various forms. Specific embodiments are illustrated in the drawing and hereafter described with the understanding that the disclosure is intended to be illustrative. The disclosure is not intended to limit the invention to the specific embodiments described and illustrated herein.

DETAILED DESCRIPTION OF THE DISCLOSURE

Systems and methods are provided that perform analysis of i) a first data stream indicative of one or both of a) eye movement and b) gaze direction of the user as the user is viewing a scene in a field of view of the user and ii) a second data stream indicative of visual content in the field of view of the user to determine whether content of interest to the user may be present in the scene being viewed by the user.

For example, the systems and methods may combine eye tracking and visual content analysis to accurately track visual attention and identify salient visual content that may be present in a scene in a field of view of a user. In an example, the disclosed system obtains a first data stream, such as a first image stream including a plurality of video frames depicting an eye gaze of the user as the user is viewing a scene in a field of view of the user. The first data stream may be obtained, for example, from an inward-facing camera that may be attached to a frame of smart eyewear worn by the user as the user is viewing the scene. The system may also obtain a second data stream, such as a second image stream including one or more images or video frames capturing visual content in the field of view of the user. The second data stream may be obtained, for example, from a forward-facing camera that may be attached to the frame of smart eyewear worn by the user as the user is viewing the scene. The system may then detect, based on the first data stream and the second data stream, that content of interest to the user is present in the scene in the field of view of the user. For example, the system may perform eye gaze analysis based on the first data stream and may also perform visual content analysis based on the second data stream to efficiently and accurately determine when the user is paying attention to visual content of interest to the user in the scene. In response to detecting that content of interest to the user is present in the scene in the field of view of the user, the system may trigger an operation to be performed with respect to the scene in the field of view of the user. As an example, the system may trigger recording of a video snippet depicting the scene in the field of view of the user.

In some examples, eye tracking and visual content analysis may be unified. In one example, a temporal visual analysis network is provided to concurrently analyze the first image or video stream indicative of eye movements of a user and a second image or video stream depicting visual content that is being viewed by the user. Eye tracking analysis may thus efficiently capture human visual regional focus in the scene, focusing video analysis on regions of interest and eliminating analysis of other, superfluous, regions of the scene thereby improving computational efficiency. In some examples, eye tracking is used to detect human visual attention, and video content analysis is triggered only when human attention is likely. In some aspects, eye movement types, such as saccades or smooth pursuit, are detected and serve as an "intermediate" supervision incorporated into the learning process. These and other techniques described herein allow the disclosed systems and methods to efficiently and accurately track visual attention of a user as the user is viewing a scene, and to make accurate decisions based on likelihood that certain regions and/or objects within the scene are of interest to the user. A decision that a scene contains an object or region of interest to the user may then trigger a recording that captures the scene for subsequent display to the user and/or may be used to generate visual content to be displayed to the user, such as in an augmented or virtual reality application being used by the user.

The disclosed systems and methods may be used in a wide variety of applications and fields, including, for instance, sightseeing, lifelogging, and sports logging. In some examples, the disclosed systems and methods may be used with video editing applications to automatically create high-quality video journals, e.g., vlogs, using the captured visual moments. The disclosed methods and systems may also be used in various domains other than personal content recording. For example, the disclosed methods and systems may be used in industry, education, medical and gaming applications to support on-site visual information gathering and/or remote communication and interaction.

The disclosed systems and methods are suitable for use in wearable and/or other battery-powered and/or embedded systems, but not limited thereto. Although the disclosed systems and methods are generally described as being implemented locally in a wearable device, such as a camera system integrated with eyewear, any one or more aspects of the data processing described herein may be implemented remotely, for example at a remote server. The number, location, arrangement, configuration, and other characteristics of the processor(s) of the disclosed systems, or the processor(s) used to implement the disclosed methods, may vary accordingly.

Although described in connection with wearable video applications, the disclosed methods and systems are used in connection with other applications involving human video attention tracking, in some examples. The configuration, arrangement, location, and other characteristics of the components of the disclosed systems may vary accordingly. The disclosed methods and systems may vary in alternative or additional ways. For instance, the disclosed systems and methods may also include with human-computer interface components, such as human-computer components used in augmented and/or virtual reality applications.

FIG. 1 is a block diagram of an example system 100 configured to identify content of interest to a user in visual content of a scene in a field of view of the user in accordance with one example. The system 100 includes a first sensor 102 and a second sensor 104. The first sensor 102 and/or the second sensor 104 may comprises a single sensor or may comprise multiple sensors, such as multiple sensors of different types. The first sensor 102 may be a gaze movement and/or direction sensor configured to capture, detect, or otherwise obtain data indicative of eye movement and/or gaze direction of the user as the user is viewing the scene. In various examples, the first sensor 102 may comprise one or more of i) a camera, such as a visible light camera, an infrared camera, etc. that may be configured to capture image or video depicting one or both eyes of the user, ii) an infrared sensor configured to capture eye orientation based on active IR illumination of one or both eyes of the user, iii) a camera configured to passively capture appearance of or one or both eyes of the user, etc. Additionally or alternatively, the first sensor 102 may comprise one or more wearable position and/or orientation sensor devices, such as an accelerometer, a gyroscope, a magnetometer, etc., that may be attached to the user (e.g., user's head, user's body, etc.), or to a wearable device (e.g., eyewear) that may be worn by the user, and may be configured to detect position and/or orientation of the user (e.g., user's head and/or body) relative to the scene being viewed by the user. In an example, the orientation and/or position of the user relative to the scene being viewed by the user may be indicative of the eye movement and/or gaze direction of the user relative to the scene. In other examples, the first sensor 104 may additionally or alternatively comprise other suitable sensor devices that may be configured to capture or otherwise generate data indicative of one or both of a) eye movement and b) gaze direction of the user as the user is viewing a scene in a field of view of the user.

The second sensor 104 may be a visual scene sensor that may be configured to capture image data, video data, etc. capturing the scene in the field of view of the user. In various examples, the second sensor 104 may comprise one or more of i) a camera, such as a visible light camera, an infrared camera, etc., ii) a camcorder, iii) a video recorder, etc. In other examples, the second sensor 104 may additionally or alternatively comprise other suitable sensor devices that may be configured to capture or otherwise generate data, such as image or video data, indicative of visual content in the field of view of the user.

In an example, the first sensor 102 and the second sensor 104 are mounted on eyewear, such as glasses or goggles, that may be worn by a user, with the first sensor 102 (sometimes referred to herein as "eye camera") configured as an inward-facing sensor, e.g., facing the eyes of the user, and the second sensor 104 (sometimes referred to herein as "world camera") configured as a forward-facing sensor with respect to field of view of the user. In other examples, instead of being attached to a user or to a device worn by the user, the first sensor 102 and/or the second sensor 104 may be located at a suitable distance from the user. For example, the first sensor 102 and/or the second sensor 104 may be a distance sensor (e.g., distance camera) positioned in the vicinity of the user. As just an example, the first sensor 102 may be a web camera, or webcam, that may generally be facing the user as the user is viewing the scene.

The system 100 also includes an analytics engine 105 which, in turn, includes a gaze data processing engine 106, a visual content analyzer 108, and a decision engine 110. In examples, the analytics engine 105 comprises one or more models, such as one or more neural networks, that are trained to perform eye gaze and visual content analysis. In one example, a temporal visual analytics (TVA) network is utilized. As described in more detail below, a TVA network may unify eye-tracking and video analysis to enable accurate and computation-efficient human visual attention tracking and salient visual content analysis. In other example, other suitable eye tracking and visual content analysis systems are utilized. The analytics engine 105 may be implemented on or by a processor, such as one or more of a central processing unit (CPU), a graphical processing unit (GPU), a microcontroller, digital signal processor (DSP), a machine learning accelerator, etc. The processor implementing the analytics engine 105 may be any suitable processor that may be implemented on one or more integrated circuits, such as application specific integrated circuit (ASIC), field programmable gate arrays (FPGA), etc.

Figure 2:
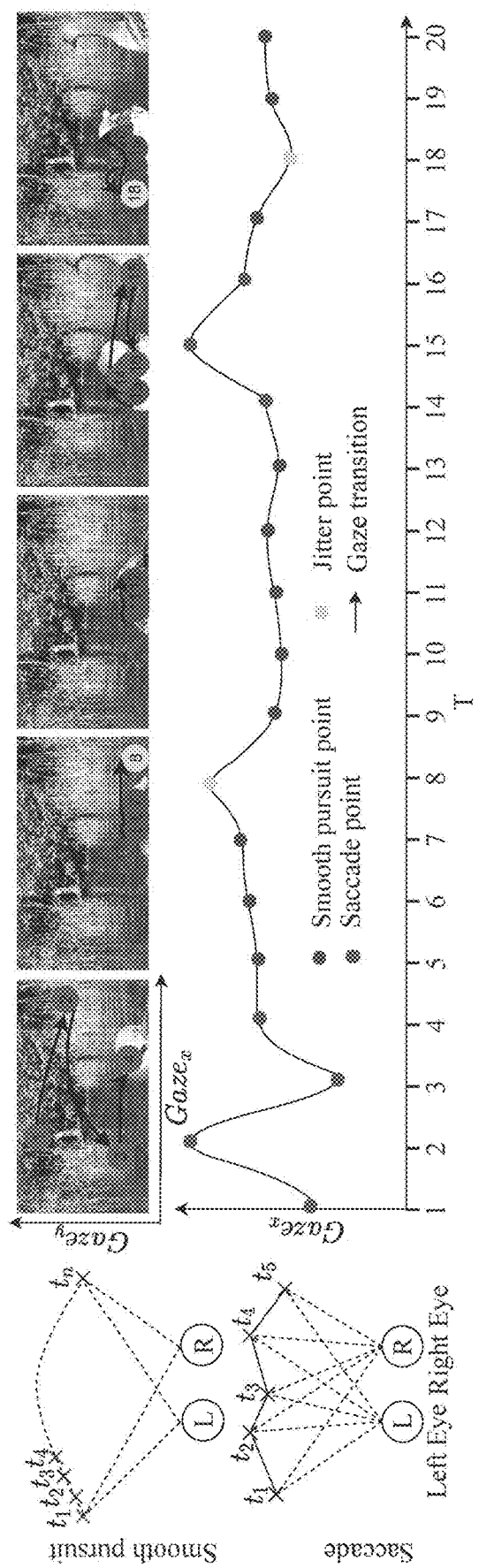
FIG. 2 depicts classification of human eye movement that may be utilized for gaze detection and tracking by the system of FIG. 1 in accordance with an example.

In examples, the gaze data processing engine 106 is configured to process data indicative of eye movement and/or gaze direction of the user that may be obtained from the first sensor 102. The gaze data processing engine 106 may thus track or otherwise detect movement, such as eye movement or head movement, of the user as the user is viewing the scene. Referring briefly to FIG. 2, human eye movement patterns can be mainly classified into two distinct and alternating phases, namely saccade and smooth pursuit. Saccade, the rapid conjugate eye shift, is triggered either voluntarily or by an external visual stimulus, indicating the change or a new moment of human visual attention. Smooth pursuit, on the other hand, refers to slow and smooth eye movements following the same object of interest. Together, a human visual attention epoch starts with a saccade phase, followed by a smooth pursuit phase. Referring again to FIG. 1, in an example, the gaze data processing engine 106 is configured to perform eye movement analysis, e.g., saccade-smooth pursuit transition detection, to detect and classify the moments of human visual attention transitions in eye movement of a user based on the input from the first sensor 102. In other examples, the gaze data processing engine 106 may track or otherwise detect human visual attention transitions based on other movement data, such as movement of the head or body of the user relative to the scene. In some examples, the gaze data processing engine 106 is further configured to estimate or otherwise determine human visual regional focus in the scene by measuring the angular direction of eye gaze relative to the field of view of the user viewing the scene.

Based on detecting changes or transitions in movement, such as when gaze of the user transitions from a saccades phase to smooth pursuit or when motion of the head of the user transitions from relatively faster movement to relatively slower movement (or vice versa), the gaze data processing engine 106 may determine that an object or region of interest may potentially exist in the scene being viewed by the user. In response to determining that an object or region of interest may potentially exist in the scene being viewed by the user, the attention tracking engine 106 may trigger the second sensor (e.g., world camera) 104 to obtain an image or video stream that may then be processed by the visual content analyzer 108. The visual content analyzer 108 may implement one or more video analytics techniques, such as identifying the salient object of human visual focus using instance segmentation, analyzing the spatial visual context using object detection and recognition, etc., to enhance visual attention tracking of the system 100 as compared to visual attention tracking systems that are based solely on eye tracking. In some examples, the second sensor (e.g., world camera) 104 has a relatively higher resolution, and a relatively higher energy consumption, as compared to the first sensor (e.g., eye camera) 102. Further, the analysis performed by the visual content analyzer 108 is generally more computationally intensive, and consumes more power, as compared to the eye tracking performed by the gaze data processing engine 106. Thus, because capture of the higher-resolution visual content capture by the second sensor 104 and/or visual content analysis by the visual content analyzer 108 are triggered only when attention is detected by the gaze data processing engine 106, computational cost and energy consumption of the visual content analyzer 108 is reduced as compared to a system in which visual content analysis is constantly, or otherwise more frequently, performed to detect human visual attention in a scene. Moreover, in some examples, visual content analysis by the visual content analyzer 108 is performed over one or more regions in a scene detected based on analysis performed by the gaze data processing engine 106, such as angular direction measured by the gaze data processing engine 106, focusing video analysis on regions of interest and eliminating visual content analysis in other, superfluous regions, thereby further improving computational efficiency, in at least some examples.

Outputs of the gaze data processing engine 106 and the visual content analyzer 108 are provided to the decision engine 110. The decision engine 110 may generate a decision (e.g., a binary decision) indicating whether or not salient content of interest to the user is present in the scene. In a case that the decision engine 110 determines that salient content of interest to the user is present in the scene, the system 100 may trigger capture of one or more images, or of a short video or snippet, by the second sensor (e.g., world camera) 104, in an example. The one or more images, or a short video or snippet, obtained by the world camera 104 may then be stored in a memory (not shown in FIG. 1) that may be local to the system 100 or in a remote device (e.g., remote server) that may be coupled to the system 100. Such capture of images, videos, snippets, etc., may be triggered each time an inference of salient content is made by the decision engine 110. In an example, the duration of the recorded snippet may be pre-determined or may be configurable in the system 100. For example, when video recording is triggered, the world camera 104 may continuously record the detected moment until a pre-defined duration threshold is reached, and the recorded snippet may be stored in a memory included in or coupled to the system 100. In some aspects, the pre-configured or configurable duration of the snippet may be set to balance desired snipped length with energy consumption of the system 100 to record and save the snippet. Because decisions of salient content are made by the decision engine 110 based on analysis performed by both the gaze data processing engine 106 and the visual content analyzer 108, scenes of actual interest to the user may be efficiently obtained, e.g., throughout a day, during an event (e.g., sporting event), etc., in an efficient and personalized manner.

With continued reference to FIG. 1, as just an example, the first sensor 102 comprises a Sony IMX 291 based eye camera and the second sensor 104 comprises a Logitech B525 based world camera (e.g., supporting a maximum resolution of 2.07 M-pixels). Of course, the first sensor 102 and the second sensor 104 are not limited to these specific camera models, and other suitable sensors or cameras are utilized as the first sensor 102 and/or the second sensor 104 in other examples. Similarly, in an example, the analytics engine 105 is implemented in the Ambarella CV28 low-power computer vision SoC platform, which is equipped with advanced image processing, high-resolution video, encoding, and CVflow computer vision processing capabilities. However, implementation of the analytics engine 105 is not so limited. In other examples, other suitable signal processing systems are utilized to implement the analytics engine 105.

In some examples, in addition to attention based visual moment auto-capture, the system 100 is configured to implement one or more eye-movement based explicit user interaction methods. For example, different types of eye movements, including but not limited to blinks, flicks, drifts, saccades, smooth pursuits, vergence movements, can be used as explicit user controls for operations and actions that may be performed by the system 100, including but not limited to taking photos, videos, making phone calls, playing music (when connected with smart phones), etc. In some examples, the system 100 additionally or alternatively supports audio/voice-based user controls to trigger operations and actions described above.

Figure 3:
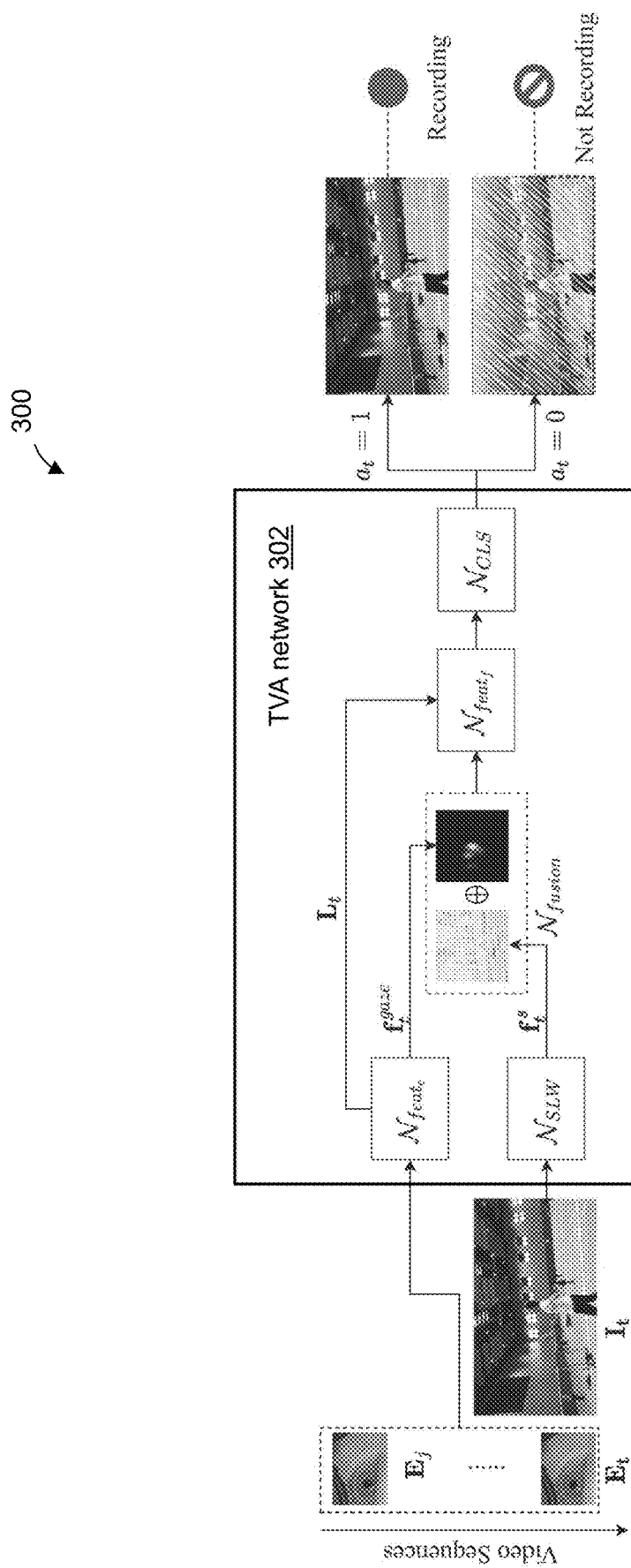
FIG. 3 is a diagram depicting an example system implementation of the system of FIG. 1 using a temporal visual analysis (TVA) network in accordance with an example.

Turning now to FIG. 3, a diagram depicting an example implementation of a system 300 with a temporal visual analysis (TVA) network 302 is provided in accordance with one example. The system 300 generally corresponds to, or is utilized with, the system 100 of FIG. 1 in some examples. For example, the system 300 corresponds to, or is included in, the analytics engine 105 of FIG. 1. The system 300 may be configured to determine or otherwise detect, based analyzing i) a first data stream indicative of eye movement and/or gaze direction of a user as the user is viewing a scene in a field of view of the user and ii) a second data stream indicative of visual content in the field of view of the user, whether content of interest to the user is present in the scene. In an example, the first data steam may be obtained from the first sensor 102 of FIG. 1 and the second data stream may be obtained from the second sensor 104 of FIG. 1. It is noted that although the system 300 is generally described herein in the context of the first sensor 102 being an eye camera and the second sensor 104 being a word camera, other suitable sensors, such as sensors described above with reference to FIG. 1, may additionally or alternatively be utilized with the system 300 in some examples.

In an example, the TVA network 302 unifies eye-tracking and video analysis to detect the user's visual attention. The TVA network 302 receives a first video stream depicted in FIG. 3 as I={I1, I2, ..., Im} and a second video stream depicted in FIG. 3 as E={E1, E2, ..., Em}, where m is the number of time steps. In an example, the first video stream I={I1, I2, ..., Im} may be a video stream captured by a forward-facing world camera (e.g., the world camera 104 of FIG. 1) capturing a scene in a field of view of a user and the second video steam E={E1, E2, ..., Em}, may be a video stream captured by an the inward-facing camera (e.g., the eye camera 102 of FIG. 1) capturing eye movements of the user as the user. For a given time step t, the TVA network 302 may predict whether the user is attentive to a newly-appeared instance (e.g., a new object) in the scene or tracks a previously-attentive instance for the current frame in the scene, with a binary result of the prediction being $a_t \in \{0, 1\}$, for example. When the TVA network 302 detects a newly-appeared instance in the scene (e.g., $a_t=1$), the TVA network may invoke high-resolution video recording. Otherwise ($a_t=0$), the current frame may be discarded, and high-resolution video recording may not be triggered, to save energy.

In some aspects, the system 300 enables automated, personalized capture of interesting visual content, with the energy-constrained wearable form factor. To this end, the TVA network 302 may deliver accurate and energy-efficient visual attention detection by unifying eye-tracking and video analysis. To generate temporally consistent predictions, the TVA network 302 continuously senses the inward-facing low-resolution eye video and extracts two essential gaze representations, which are the likelihood $L_t$ of historical eye movement types and the gaze features $$f_t^{gaze}$$

extracted from historical gaze positions. In an aspect, these two gaze representations are fused together to make an initial prediction that a potential attention epoch is occurring. In particular, the TVA network 302 uses the likelihood $L_t$ of historical eye movement types to capture gaze saccade-smooth pursuit transition, and utilizes this transition as an indicator of a beginning of an attention epoch in the scene. However, because the gaze transition likelihood $L_t$, by itself, may not be reliable in at least some situations, for example because eye movements may be subtle and difficult to identify, the TVA network 302 utilizes historical gaze positions $P_t$ to improve robustness of detection that an attention epoch has begun. In an example, if the majority of the recent gaze positions fall into a small region, such as a region having an area or a volume that is below a certain (e.g., predetermined) threshold or, more specifically, a circular region having a radius that is below a certain (e.g., predetermined) threshold, the TVA network 302 may predict with higher confidence that the user's eye movement has indeed entered a smooth pursuit phase.

To boost the accuracy of attention detection, the forward-facing high-resolution world camera may be used only when human attention is likely. In an aspect, when visual content analysis is triggered for a scene, the TVA network 302 extracts low-level scene features $$f_t^s$$

from the high-resolution image or frame $I_t$ (referred to herein as image $I_t$, video frame $I_t$, or simply frame $I_t$). The scene features $$f_t^s$$

are then fused with the gaze features $$f_t^{gaze}$$

extracted by the TVA network 320 from historical gaze positions $P_t$. Compared with the size of the original image $I_t$, the spatial resolution of the gaze features $$f_t^{gaze}$$

are generally more compact. As an example, whereas the size of the original image $I_t$ may be 224×224, the spatial resolution of the gaze features $$f_t^{gaze}$$

may be 56×56, for example. The reduced size of the gaze features $$f_t^{gaze}$$

relative to the size of the original image $I_t$ generally results in reduction in computational cost of the video content analysis performed by the TVA network 302. In aspects, the gaze features $$f_t^{gaze}$$

guide the high-resolution video analysis of the TVA network 302 to focus on analyzing the attentive local region, which may further reduce the computational cost in at least some examples.

In some aspects, the scene features $$f_t^s$$

obtained by the TVA network 302 are also fused with the likelihood $L_t$ of historical eye movement types, along with being fused with the gaze features $$f_t^{gaze}$$

extracted by the TVA network 302, to better predict the temporal attention of the user.

In the example implementation of FIG. 3, instead of treating eye-tracking and video analysis as two separate tasks, a light-weight network to perform feature fusion is provided. More specifically, a shallow network $N_{SLW}$ is applied to the original image $I_t$ to obtain the scene features $$f_t^s \text{ (i.e., } f_t^s = N_{SLW}(I_t)\text{).}$$

The historical eye tracking results are then mapped to gaze position related features $$f_t^{gaze}$$

and the likelihood of the eye movement phases $L_t$. The mapping function may be denoted as $N_{feat_e}$, i.e., Lt, $$f_t^{gaze} = N_{feat_e}$$

(Ej, . . . , Et). The gaze position related features $$f_t^{gaze}$$

are then fused with the scene features $$f_t^s$$

using a predefined operation $N_{fusion}$. In an example, predefined operation $N_{fusion}$ makes the gaze position related features $$f_t^{gaze}$$

and the scene features $$f_t^s$$

features complementary to each other so as to augment the detectability of salient region of focus in the scene. The output of the mapping operation $N_{fusion}$ is provided to a classification model $N_{CLS}$ which, in turn, generates the decision of attention at (e.g., whether or not a newly-appeared instance is present in the scene at time t).

In some aspects, the likelihood of eye movement phases $L_t$ is leveraged as an "intermediate" supervision to drive the learning process. If attention is drawn to an object, historical eye movements may follow a detectable pattern. Such detectable pattern may be used as prior knowledge to supervise the learning network. For example, an eye-movement sequence: saccade, smooth pursuit, . . . , smooth pursuit, can suggest the occurrence of attention with high confidence.

An example implementation of the system 300, having the TVA network 302 is provided in more detail herein below.

In an aspect, given an incoming eye frame $E_t$ (referred to herein as image $E_t$, video frame $E_t$, or simply frame $E_t$), the system 300 detects user attention in the scene, i.e., whether the user is potentially gazing at an object within the field of view in the scene. In an example, the occurrence of potential attention is defined as the majority of the gaze positions falling within a region in the scene with area A or smaller during a time period T. The impacts of A and T on attention detection performance are described in more detail below.

When the system 300 detects possible attention (e.g., at time t), the system 300 triggers capture of the frame $I_t$ of the scene (e.g., by the world camera 104), and visual analysis of the captured frame $I_t$, to further boost the confidence level that the user is indeed paying attention to an object in the scene. For example, the TVA network 302 may be configured to determine, based on $I_t$, $P_t$ and $L_t$, whether or not the user is actually gazing at an object within the scene, where $P_t=\{p_{t-N+1}, \ldots, p_{t-1}, p_t\}$ denotes the predicted historical gaze positions during time steps (t-N, t], where $p_k \in Z^2$, and $L_t=\{l_{t-N+1}, \ldots, l_{t-1}, l_t\}$ denotes the predicted likelihood of historical eye movement types, where each $l_i \in R \cap [0, 1]$. That is, in an example, the output of the TVA network 302 may be $a_t$=NTVA($P_t$, $I_t$, $L_t$), where NTVA represents the TVA network 302.

With continued reference to FIG. 3, when the system 300 triggers capture of the frame $I_t$ of the scene (e.g., by the world camera 104), the TVA network 302 may perform visual analysis of the image or video frame $I_t$ captured by the word camera. In an example, the TVA network 302 applies the shallow network $N_{SLW}$ to the obtained image or video frame $I_t$ to generate the scene features $$f_t^s$$

(e.g., with size 56×56×24). i.e., $$f_t^s = N_{SLW}(I_t).$$

Because the historical gaze positions $P_t$ are discrete and not differentiable, each historical gaze position may be relaxed into a continuous heatmap (e.g., of size 56×56). For example, transformation based on Gaussian distributions may be performed. In this example, for the kth gaze position $p_k \in Z^2$, the value $h_{p_i}$ for a location $p_i \in Z^2$ in the heatmap $H_k$ may be computed as $$h_{p_i} = \frac{w_k}{\sigma\sqrt{2\pi}} \exp\left(-\frac{D^2(p_i, p_k)}{2\sigma^2}\right), \quad \text{Equation 1}$$

where $D(p_i, p_k)$ represents the Euclidean distance between $p_i$ and $p_k$, and $w_k$ is a pre-defined weight related to the time step k. Applying the Gaussian relaxation of Equation 1 to each gaze position in $P_t$ generates N heatmaps $\{H_{t-N+1}, \ldots, H_{t-1}, H_t\}$ of resolution 56×56, for example. The generated heatmaps correspond to the extracted gaze features $$f_t^{gaze}.$$

The generated heatmaps are therefore sometimes referred to herein as gaze heatmaps $$f_t^{gaze}.$$

In an aspect, the gaze heatmaps $$f_t^{gaze},$$

the scene feature $$f_t^s$$

s and their element-wise product $$f_t^{gaze} \circ f_t^s$$

are concatenated channel-wise to fuse the information obtained from gaze analysis of the image or video frames $E_t$ with information obtained from video analysis of the scene image or video frames $I_t$. The resulting features, which may be of size 56×56×(24+8), for example, are then fed into one convolution layer Conv0, e.g. with 56 output channels, in an example. A following fully connected layer FC0 may be provided to gradually reduce the channels into two representing the probability of the binary action $a_t$. In addition, in an aspect, the likelihood $L_t$ of historical eye movement types is appended with the input tensor of FC0 layer to supervise learning of the TVA network 202 during training and, in some aspects, to further enhance inference during testing.

As will be described in more detail below, in various examples, training of the TVA network 302 may be performed using a suitable image database that includes images and/or video streams depicting a variety of scenes viewed by a variety of users. In an example, the training of the TVA network 302 is performed using Adam as the optimizer, with an initial learning rate of 0.01. The initial learning rate may be decreased by 10% after every 30 epochs until 100 epochs have occurred. For the shallow network NSLM in TVA network 302, a suitable convolutional neural network architecture may be utilized. For example, one or more blocks (e.g., the first two blocks) of MobileNetV2 architecture may be adopted to extract the scene frame features. In at least some examples, MobileNetV2 is efficient enough for mobile devices. In other examples, other suitable energy efficient neural network architectures may be utilized. Pre-trained weights may be used as a starting point for training the TVA network 302. During training, NSLM may be frozen during one or more initial epochs (e.g., the first 30 epochs). In other examples, other suitable training methods may be utilized.

As discussed above, in at least some examples, the disclosed systems (e.g., the system 100 of FIG. 1 or the system 300 of FIG. 3) and methods are utilized in energy constrained platforms and applications, such as wearable camera integrated with eyewear or other suitable wearable applications. As also discussed above, the disclosed systems and methods, such as systems and methods that combine eye tracking and visual content analysis to detect visual attention, reduce energy consumption relative to systems that may utilize eye tracking and/or visual content analysis individually to detect human visual attention.

Generally, energy consumption of the disclosed systems and methods is mainly contributed by the world camera, eye camera, the TVA network, and the high-resolution video recording. The operation of an imaging pipeline generally starts with sensing incoming light and converting it into electrical signals. Then, an image signal processor (ISP) receives the electrical signals and encodes them into a compressed format. The energy consumption of imaging pipeline is contributed to by the following three components: $E_{sensor}$ (image sensor), $E_{ISP}$ (ISP), and $E_{comm}$ (communication), as follows:

$$E_{imaging} = E_{sensor} + E_{ISP} + E_{comm}. \quad \text{Equation 2}$$

Referring first to the sensor energy consumption $E_{sensor}$ term in Equation 2, the operation of an image sensor consists of three states, i.e., idle, active, and standby. The power consumption of the standby state is generally negligible (typically in the range of 0.5-1.5 mW). Thus, ignoring the power consumption of the standby state from the energy model, the sensor energy may be defined as follows:

$$E_{sensor} = P_{sensor,idle} \cdot T_{exp} + P_{sensor,active} * T_{sensor,active}, \quad \text{Equation 3}$$

where $P_{sensor,idle}$ and $P_{sensor,active}$ are the average power consumption when the sensor is in the idle state and active state, respectively; $T_{exp}$ is the exposure time, where the image sensor is idle during the exposure phase; $T_{active}$ is the time duration when the image sensor is active, which is determined by the ratio of transferred frame resolution $R_{frame}$ to the external clock frequency f, i.e., $R_{frame}/f$. Here, $P_{sensor,idle}$ and f can be viewed as sensor-specific constants, and $P_{sensor,active}$ is a linear function of sensor resolution R ($R \geq R_{frame}$).

Turning now to the ISP energy consumption $E_{ISP}$ term in Equation 2, the ISP operates in two states: idle and active. It is active during image processing ($T_{ISP}$) and idle during image sensing. The time for image sensing is the sum of exposure time Texp and the transferring time of frame (in pixels), i.e., $R_{frame}/f$. The energy consumption of ISP is then determined as follows $$E_{ISP} = P_{ISP,active} \cdot T_{ISP} + P_{ISP,idle} \cdot (T_{exp} + R_{frame}/f), \quad \text{Equation 4}$$

where $P_{ISP,active}$ and $P_{ISP,idle}$ are the average power consumption of the ISP in the active and idle state, respectively.

Turning now to the communication energy consumption $E_{comm}$ term in Equation 2, the energy consumption of the communication interface Ecomm is a linear function of the number of transferred frame pixels $R_{frame}$, as follows $$E_{comm} = k \cdot R_{frame}, \quad \text{Equation 5}$$

where k is a design-specific constant determined by the communication interface.

As can be seen from Equations 2-5, the energy consumption of cameras highly depends on the sensor resolution. In at least some of the disclosed systems and methods, the energy consumption of the high-resolution world camera is significantly higher than that of the eye camera. Therefore, in at least some such disclosed systems and methods, eye-tracking alone is used to first detect potential attention events, and only then turning on the world camera for accurate attention detection and salient content recording, thereby effectively minimizing the energy cost from the world camera.

More specifically, in a system equipped with a TVA network, such as the TVA network 302 of FIG. 3, the operation of the TVA network may include at least two stages. First, the TVA network may continuously perform eye-tracking to detect potential attention events. This stage has high energy efficiency, due to the low data rate of the eye camera and computationally-efficient eye tracking. When a possible attention event is detected, the TVA network may invoke a second stage, using a light-weight network to perform eye-scene feature fusion in order to finalize the attention decision. The average power of the two stages may be denoted as $P_{eye\ tracking}$ and $P_{fusion}$, respectively. The energy consumption of the system may then formulated as follows:

$$E_{system} = T_{always-on} \times (P_{eye\ camera} + P_{eye\ tracking}) + T_{fusion} \times (P_{world\ camera} + P_{fusion}) + T_{auto-captured} \times (P_{world\ camera} + P_{encoding-storing}), \quad \text{Equation 6}$$

where $T_{always-on}$ is the operation time of the disclosed system, $P_{eye\ camera}$ and $P_{world\ camera}$ are the power consumption of the inward-facing eye camera and the forward-facing world camera, respectively, $T_{fusion}$ is the operation time of eye-scene feature fusion, $T_{auto-captured}$ is the operation time of high-resolution video recording when human visual attention events are detected, $P_{encoding-storing}$ is the power consumption of the host processor during high resolution video recording, mostly contributed by video encoding and storage. Compared with the eye-tracking alone stage, the second stage is more data and computation intensive, but is only triggered when potential attention events are detected, and, in at least some examples, stays off most of the time, thus effectively reducing energy cost. In addition, the TVA network consists of a light-weight network architecture, which is significantly more efficient than the existing VIS-based design, e.g., MaskTrack R-CNN architecture. The disclosed TVA network significantly outperforms the VIS-based method in terms of system energy efficiency, in at least some examples.

Figure 4:
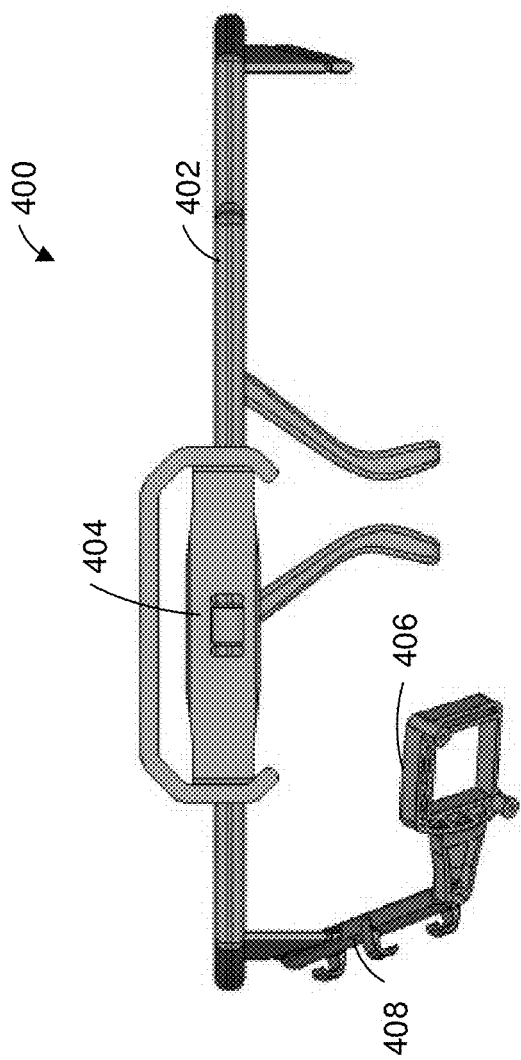
FIG. 4 depicts example smart eyewear equipped with the disclosed system in accordance with an example.

Turning now to FIG. 4, an example smart eyewear 400 equipped with the disclosed system, in accordance with an example, is depicted. The example eyewear system 400 comprises a frame 402. A front-view camera 404 is installed on the upper side of the eyewear frame 402. An inward-looking eye camera 406 is secured by a standalone arm 408. In an example, when the smart eyewear 400 is worn by a user, the inward-looking eye camera 406 may capture and analyze eye gaze of the user as described herein and the front-view camera 404 may sample and analyze the field of view of the user as described herein. In an example, the front-view camera 404 may have relatively higher resolution as compared to the inward-looking eye camera 406. As just an example, the front-view camera 404 may be the Logitech B525 camera having 1,280×720 resolution and the inward-looking eye camera 406 may be the Sony IMX 291 camera having 320×240 resolution. In other examples, other suitable cameras and/or sensors are utilized as the front-view camera 404 and/or the inward-looking eye camera 406.

Figure 5:
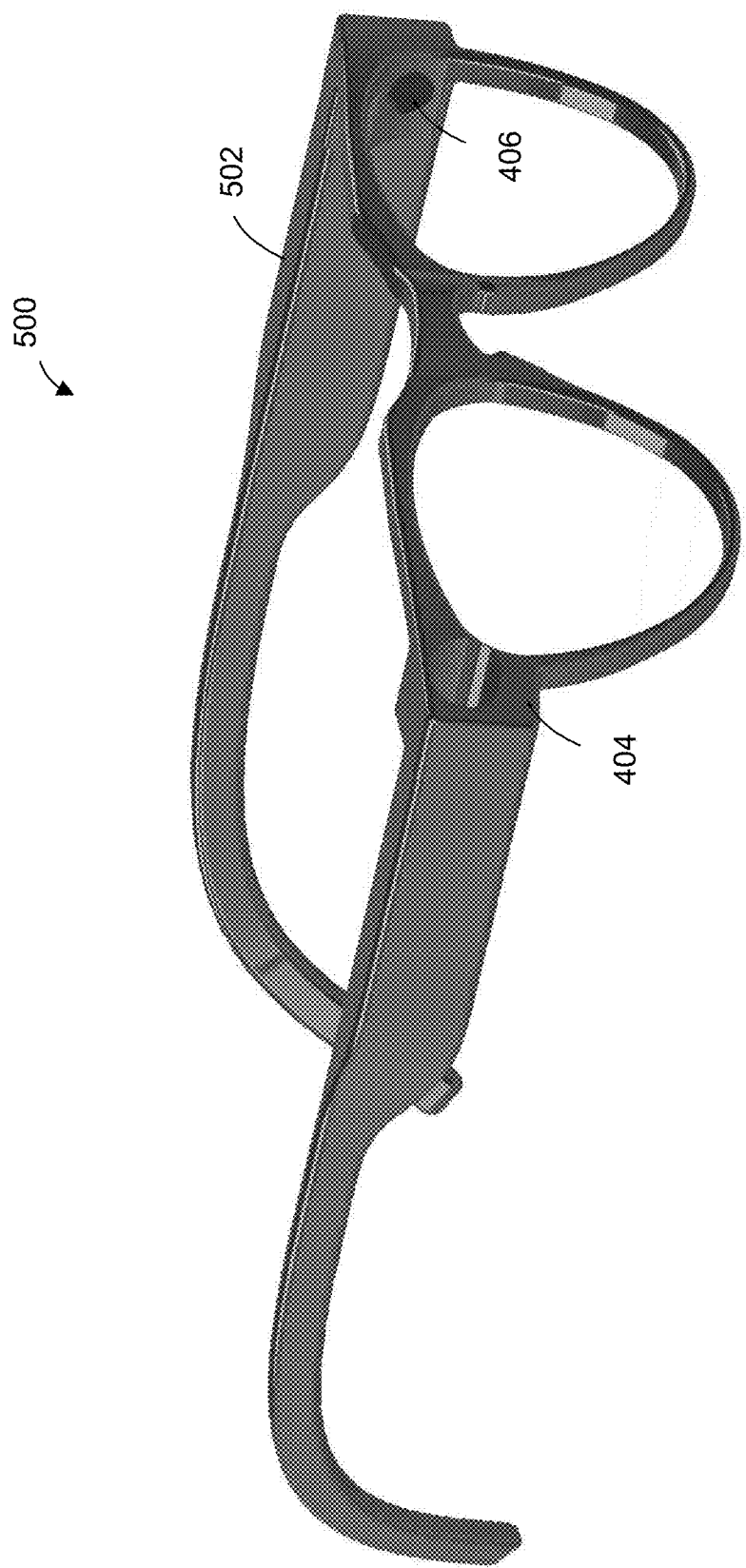
FIG. 5 depicts another example smart eyewear equipped with the disclosed system in accordance with another example.

FIG. 5 depicts another example smart eyewear 500 equipped with the disclosed system, in accordance with another example. The smart eyewear 500 is generally similar to the smart eyewear 400 of FIG. 4 except that in the smart eyewear 500, the standalone arm 408 is removed and the inward-looking eye camera 406 is integrated directly into a frame 502 of the smart eyewear 500, such as attached to a leg of the smart eyewear 500. In an example, an image signal processor is also integrated directly into the frame 502 of the smart eyewear 500, such as attached to a leg of the smart eyewear 500.

Figure 6:
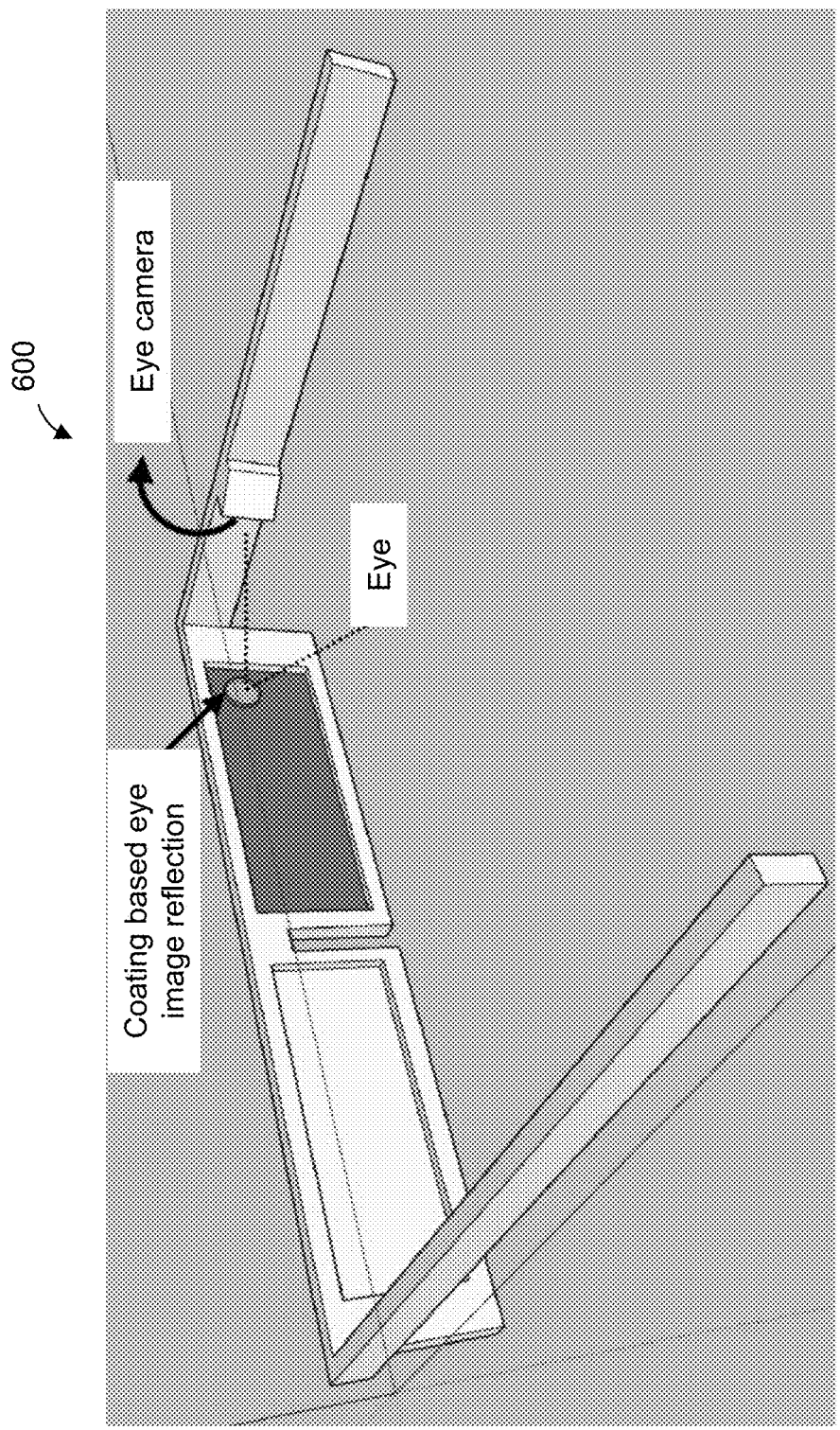
FIG. 6 depicts yet another example smart eyewear equipped with the disclosed system in accordance with yet another example.

FIG. 6 depicts yet another example smart eyewear 600 equipped with the disclosed system, in accordance with yet another example. In the example smart eyewear 600, coating-based eye image reflection is used to capture eye gaze of the user. For example, a transparent yet reflective coating is applied to a small spot on the lens and or frame, and the eye camera is installed on the inner-side of the arm. When a user wears the smart eyewear 600, images or videos depicting eye movements of the user are captured by the eye camera via optical reflection from the reflective coating spot, in this example.

Referring to FIGS. 4-6, the smart eyewear 400, 500, 600 may use the Jetson Xavier NX mobile computing platform or other suitable low energy computing platform configured to perform image signal processing as described herein. In another example, a low-power vison platform, such as the Ambarella CV28 platform, is integrated directly integrated into one of the eyewear legs, with a battery in the other leg. The CV28 platform is equipped with built-in advanced image processing, high-resolution video encoding, and CVflow computer vision processing capabilities. The typical power consumption of CV28 is in the range of 500 mW, which is suitable for battery-powered wearable design. In other example, other suitable low-power platforms are utilized.

In various examples, the disclosed systems and methods (e.g., the system 100 of FIG. 1 or the system 300 of FIG. 3) may be trained and/or evaluated using one or more datasets that comprise images and/or videos containing various content that may be of interest to different users. In an example, the YouTube-VIS dataset may be adopted as "micro-benchmark in a controlled setting" to quantitatively evaluate technical capability of the disclosed systems and methods. The YouTube-VIS dataset covers a wide range of complex real-world scenarios. For instance, the dataset consists of temporally dynamic scenes, such as sports, as well as spatially diverse scenes, such as multiple objects within the same scene. Therefore, using the YouTube-VIS dataset, a wide range of interesting testing cases may be designed to evaluate the accuracy and efficiency of the disclosed system for eye tracking and attention detection. For example, the participant is initially attracted by a white duck within a scene consisting of multiple animals, and then his or her attention shifts towards a different animal. In addition, the YouTube-VIS dataset includes necessary object annotation information regarding object location, classification, and instance segmentation. Such annotations help us to accurately set up the ground truth in terms of the objects of interest during the experiments. Of course, the YouTube-VIS dataset is only one example dataset, and other suitable datasets may additionally or alternatively be utilized.

Figure 7:
FIG. 7 depicts examples of classified video frames in a dataset used for training and/or evaluation of the disclosed system in accordance with an example.

The YouTube-VIS dataset consists of a 40-category label set and 2,238 videos with released annotations. Each video snippet lasts 3 to 5 seconds with a frame rate of 30 fps, and every 5th frame is annotated for each video snippet. The 2,238 videos may be divided into a suitable number of classes based on their content. For example, four classes, including Animal, People, Vehicle, and Others, may be utilized. The four classes may contain 1487, 437, 215, and 99 videos, respectively, for example. Videos in each class may then be randomly selected. In an example, 1,000 videos total (670, 197, 97, and 36, respectively, in the four classes) may be selected. FIG. 7 depicts cases of the 4-class video frames in YouTube-VIS dataset. The bounding boxes in the images in FIG. 7 mark the pre-selected objects of interest.

In some examples, multiple video snippets in the dataset may be concatenated to provide videos having duration of a suitable length. For example, because each video snippet lasts 3 to 5 seconds in the YouTube-VIS dataset, each video snippet lasts 3 to 5 seconds in the YouTube-VIS dataset, multiple video snippets maybe concatenated to form videos with a duration of about 7-15 minutes (approximately 100 video snippets). The concatenated video may then be provided to the participants to watch while wearing smart eyewear, such as smart eyewear 400, 500, 600 of, respectively, FIGS. 4, 5, 6. As participants watch the videos, their eye data may be collected. To alleviate the potentially person-dependent bias, each video snippet may be watched by multiple participants.

The disclosed systems and methods use an inward-facing eye camera and a world camera to capture eye video data and world scene data, respectively, as described herein. In an example, correlation between the world camera and the eye camera may be performed. For example, calibration using Pupil Capture may be performed. In an example, each participant watches approximately 100 videos randomly selected from four classes in benchmark video data, ensuring that each video in our benchmark can be watched by several (e.g., three) participants. The target attentive object is pre-selected in each video snippet as users' visual interest, and the participants may be guided to gaze at the pre-assigned object while the users' motion is tracked. Thus, the users' eye video dataset that is synchronized with the video dataset may be obtained. In the following experiments, the video dataset and the eye dataset are randomly divided into training set, test set, and validation set with a 70%:10%:20% ratio.

In an example, precision and recall may be used to evaluate the accuracy of human visual attention tracking of the disclosed system. The precision and recall may be defined as follows:

$$\text{precision} = \frac{TP}{TP + FP}, \qquad \text{Equation 7}$$

and $$\text{recall} = \frac{TP}{TP + FN}, \qquad \text{Equation 8}$$

where TP (true positive) denotes when system correctly identifies the attentive object of interest, FN (false negative) denotes when the system fails to identify the attentive object of interest, and FP (false positive) denotes when the system incorrectly identifies an object of interest that the user actually did not pay attention to. In summary, the higher the precision and recall, the better the accuracy of the system. In addition average precision (AP), which jointly considers precision and recall measures, may be considered as follows.

$$AP = \Sigma_n (\text{recall}_n - \text{recall}_{n-1}) \times \text{precision}_n, \qquad \text{Equation 9}$$

where $\text{precision}_n$ and $\text{recall}_n$ are the precision and recall at the nth threshold.

Table 1 shows the accuracy and energy efficiency comparison between the disclosed system and three baseline methods. The precision, recall, and average precision AP of each method are shown in columns.

TABLE 1

| Method | Precision | Recall | Average Precision | Energy Savings |
|---|---|---|---|---|
| TVA-Based Method | 87.50% | 86.40% | 93.65% | 70.61% |
| Eye-Tracking-Alone Method | 40.52% | 12.70% | 35.93% | 76.97% |

TABLE 1-continued

| Method | Precision | Recall | Average Precision | Energy Savings |
|---|---|---|---|---|
| VIS-Based Method | 98.08% | 90.26% | 93.40% | 0.00% |
| Saliency-Map-Based Method | 40.08% | 37.94% | 35.17% | 24.97% |

The three baseline methods depicted in Table 1 include eye-tracking alone, Vis-based object detection and saliency-map-based method. Eye-tracking-alone uses eye tracking alone to capture potential attentive visual content. Specifically, eye tracking may first be used to detect the saccade-smooth pursuit transition, an indication of potential visual attention shift. Then, the gaze regional focus may be measured relative to the field of view during a smooth pursuit phase or a fixation phase for a time period. The occurrence of actual attention may be experimentally defined as when 90% gazes being located in a close region with area $A=(0.05 \times W) \times (0.05 \times H)$ for a time period t, where W and H denote the width and height of viewing scene frame, respectively, and 0.05 is the rescaling ratio. Considering that the Logitech B525 camera has a 69° diagonal field-of-view and angular error is approximately with median value of 3.45°, the rescaling ratio may be estimated as 3.45/69 (i.e., 0.05). The effectiveness of how T affects the performance of attention detection is described in more detail below.

VIS-based method uses eye tracking and VIS-based object detection to jointly capture potential attentive visual content, and the VIS-based object detection task adopts the MaskTrack R-CNN architecture. In the VIS-based method, eye tracking and VIS-based object detection are two independent, parallel tasks. As a result, VIS-based object detection is always on, which may introduce significant computation and energy overhead. As will be shown in the experimental results, the processing speed of the VIS-based method is only 0.6 frames per second, preventing it from practical adoption into wearables.

Saliency-map-based method aims to predict the salient regions that has potentially attracted the use's attention.

To evaluate the accuracy of the system, the participants may be asked to review the baseline video and manually mark the moments reflecting his or her true interest during recording (ground truth), which are then compared against the video clips auto-captured by the disclosed system. Table 2 summarizes the accuracy of the disclosed system in one example. As shown in Table 2, the disclosed system can accurately detect and automatically capture 96.05% of visual moments of interest across the 11 pilot studies. In other words, the video clips auto-captured by the disclosed system accurately reflect the users' moments of interest.

TABLE 2

| No. | Scenario | Record (minute) | Auto-Captured (minute) | Duration Reduction | Number of True Interest | Number of Missed Interest | Energy Savings |
|---|---|---|---|---|---|---|---|
| 1 | Lifelogging | 1.76 | 0.13 | 92.61% | 3 | 0 | 90.68% |
| 2 | Academic events | 4.72 | 0.67 | 85.74% | 5 | 0 | 83.80% |
| 3 | Grocery shopping | 3.71 | 0.47 | 87.41% | 3 | 0 | 85.48% |
| 4 | Sports logging | 5.12 | 0.29 | 94.37% | 3 | 0 | 92.43% |
| 5 | Going for a walk | 9.01 | 1.14 | 87.30% | 5 | 0 | 85.37% |
| 6 | Cooking | 30.78 | 6.28 | 79.61% | 6 | 0 | 77.67% |
| 7 | Playing game | 22.74 | 0.44 | 98.08% | 5 | 2 | 96.15% |
| 8 | Driving #1 | 32.49 | 4.69 | 85.58% | 5 | 1 | 83.64% |
| 9 | Shopping mall | 71.24 | 18.94 | 73.42% | 22 | 0 | 71.49% |
| 10 | On campus | 31.82 | 0.96 | 96.99% | 10 | 0 | 95.06% |
| 11 | Driving #2 | 31.15 | 3.07 | 90.15% | 6 | 0 | 88.22% |

As discussed above, in an example, the disclosed system uses attention tracking to control personalized moment auto-capture. As also described above, in an example, the disclosed system uses a duration of the smooth pursuit phase to determine the level of interest of the user. In an example, the TVA network disclosed herein (e.g., the TVA network 302 of FIG. 3) uses the parameter T to determine a duration of time for which a potential smooth pursuit phase is to be detected using eye tracking before triggering high-precision attention tracking and, in some examples, salient content recording. As described above, attention is a direct indicator of salient visual content. Furthermore, the attention level, or the level of interest, can be quantified by T, the duration of the smooth pursuit phase, and longer duration implies stronger personal interest. Therefore, T controls the selectivity of moment recording. Furthermore, the disclosed TVA network uses computation-efficient eye-tracking to detect potential attention events. A larger T makes eye-tracking more selective. Therefore, the fusion stage of the TVA network, which is more computation and energy intensive, will be triggered less frequently, thereby improving system energy efficiency. By adjusting the value of T, the disclosed system may control the selectivity of moment recording, as well as the energy efficiency of the system.

FIG. 8A depicts the impact of T on the trigger rate a of the disclosed system. As shown in FIG. 8A, the trigger rate a decreases as T increases. FIG. 8B shows the impact of T on the energy consumption of attention detection in the disclosed system. As shown in FIG. 8B, the energy saving increases as T increases. This is due to the fact that, with the increase of T, the eye-tracking component of the TVA network becomes more selective, and the data and computation intensive fusion stage is less likely to be triggered, thereby reducing the energy cost.

Figure 9:
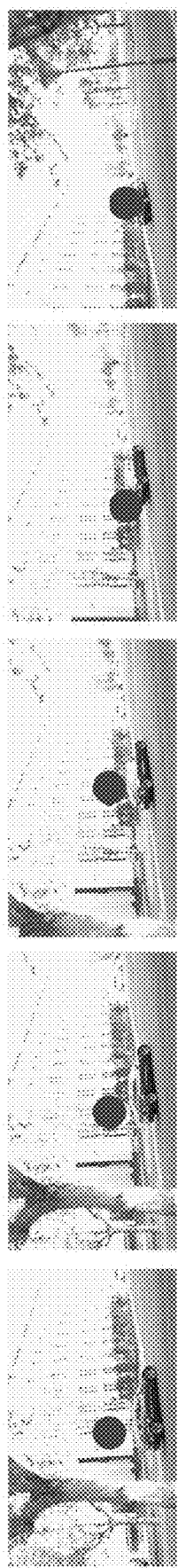
FIG. 9 depicts an environment with noise and jitter as user's attention focuses on a fast-moving vehicle that may be accurately detected by the disclosed system in accordance with an example.

As described above, eye-tracking-alone may not provide accurate attention tracking, due to limited tracking resolution and inherently noisy eye movement patterns. As depicted in FIG. 9, the user's attention focuses on a fast-moving vehicle, and gaze trajectory is jittering and noisy.

Therefore, it is challenging for eye tracking to distinguish between saccade and smooth pursuit. In contrast, the TVA network leverages both regional information provided by eye tracking and object and semantic level information by video analytics, thus is able to accurately detect the fast-moving vehicle as the object of interest.

Figure 10:
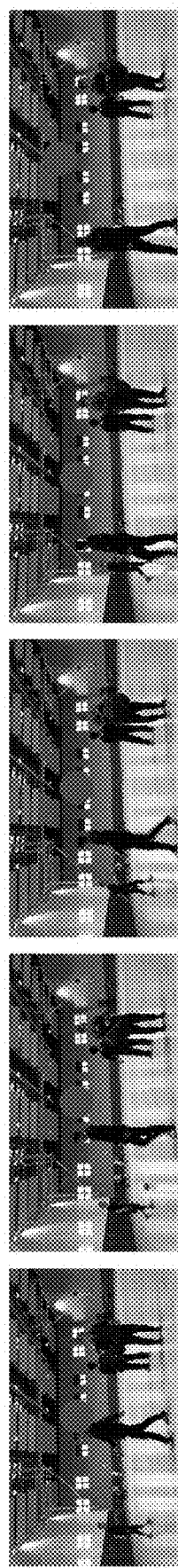
FIG. 10 depicts an environment in which the disclosed system recognizes that a regional visual focus along the user's gaze trajectory does not match a specific object in accordance with an example.

On the other hand, to consider a frequent inattentive event in which a person is not paying attention to the surrounding environment and gaze is fixed on one position. Eye tracking alone may mistakenly classify this case as a qualified attention event. In contrast, the TVA network is able to detect such a false positive case. Specifically, as depicted in FIG. 10, the TVA network recognizes that the regional visual focus along the gaze trajectory does not match a specific object. Therefore, there is no salient visual object that draws the user's attention.

In examples, the disclosed system analyzes the relationship between human attention and interest from the following three aspects simultaneously: (1) the temporal transition from saccade to smooth pursuit, which suggests potential visual attention shift; (2) the gaze duration of following a moving target or fixating on a stationary target, which qualitatively measures the current interest level. In general, the longer the duration, the more interested the user might be; and (3) scene analysis and understanding, which helps to detect cognitively whether there are potentially interesting objects within the region of gaze points. By jointly considering the aforementioned three aspects, the disclosed system is able to tackle special corner cases such as mind-wandering and driving scenarios. For example, the user may gaze at a position for a long time unconsciously when mind wandering. In this case, the disclosed system leverages scene understanding to help decide whether a potential target of interest exists or not. If not, the disclosed system filters out those moments. In another case, the user's attention may temporally drift away and then quickly shift back if no interesting objects are detected. Such attention shifts can be captured and then discarded (due to short duration) by the disclosed system.

Figure 11:
FIG. 11 and FIG. 13 show true moments of interest auto-captured by the disclosed system and otherwise discarded by the disclosed system, respectively, in accordance with examples.
Figure 12:
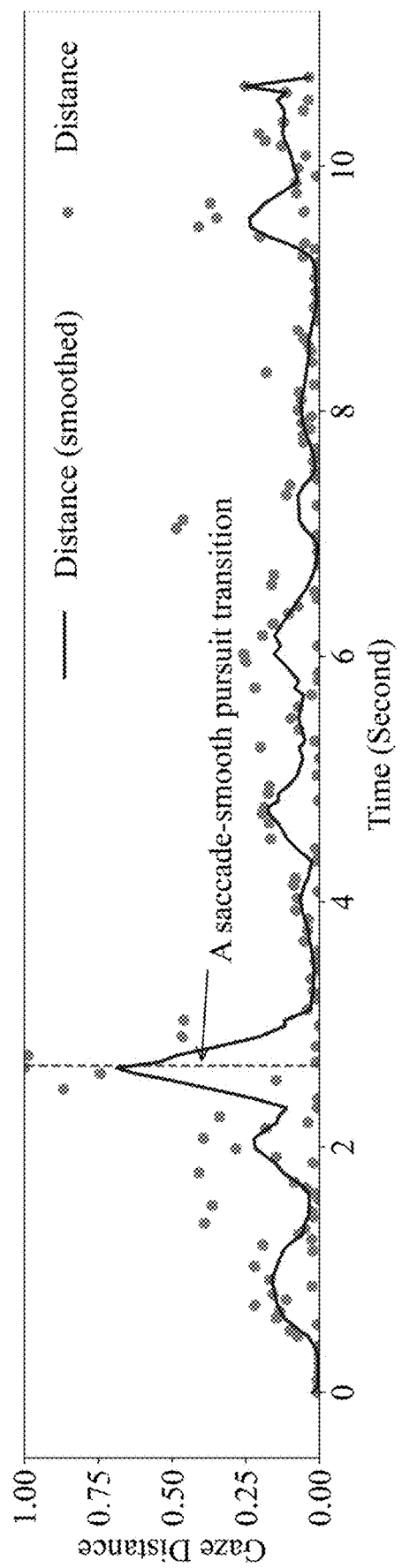
FIG. 12 and FIG. 14 illustrate time-series normalized gaze distance between two successive frames in the true moments of interest depicted in FIG. 11 and FIG. 13, respectively, in accordance with examples.
Figure 13:
Figure 14:
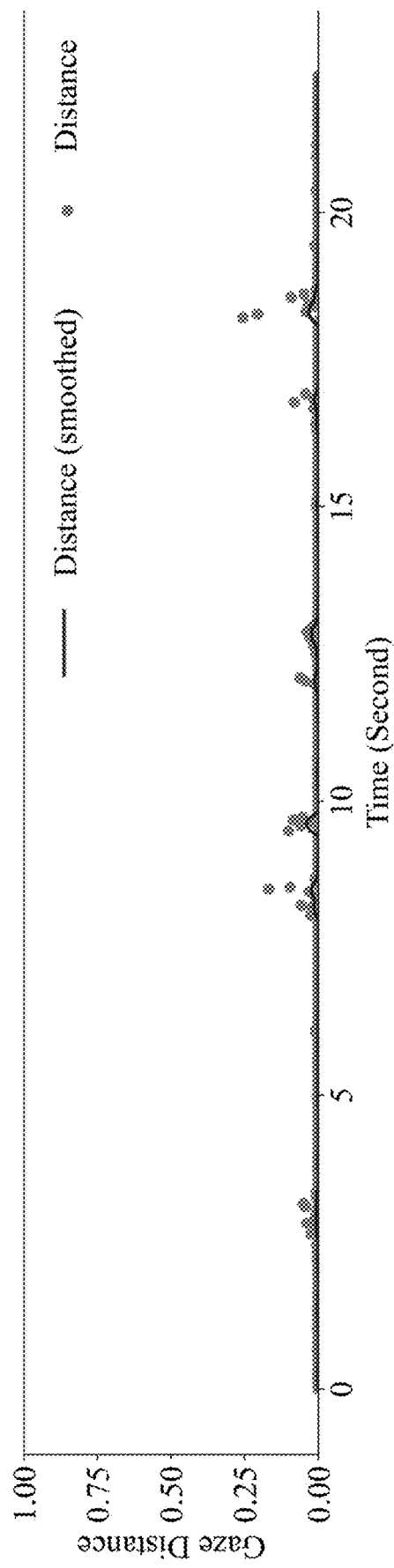

FIG. 11 and FIG. 13 show true moments of interest auto-captured by the disclosed system and otherwise discarded by the disclosed system, respectively. Specifically, FIG. 11 and FIG. 13 show successive video frame sequence recorded by the disclosed system with marked gaze positions (circle). FIG. 12 and FIG. 14 illustrate the time-series normalized gaze distance between two successive frames. For the true moments of interest shown in FIG. 11 and FIG. 12, it can be seen that: (1) there is a saccade-smooth pursuit transition at approximately 2.40 seconds; (2) after that, most of the eye movements are smooth pursuit or fixation; and (3) the attention is located on a girl who is playing guitar. In a driving case, as shown in FIG. 13, the driver gazes at a fixed location in his field-of-view without any obvious target or object. As shown in FIG. 14, some gaze shifts can be seen, such as at time 17 seconds. However, those gaze shifts do not qualify for possible attention because we cannot find one stable object that the user continuously focuses on. Thus, those moments are discarded by the disclosed system.

Energy efficiency is essential to wearable devices. In the disclosed system, high-resolution video capture and content recording pipeline through the world camera is energy demanding. The disclosed system significantly reduces such use only when potential visual attention and moments of interest are detected. As shown in Table 2, the disclosed system triggers the world camera and records moments of interest accounts for a small percentage of the total usage time. Furthermore, in an example, even though the eye tracking process is always on, this stage has high energy efficiency due to the low data rate of the eye camera and energy-efficient TVA network architecture design. The always-on eye-tracking process is approximately 51.98× more energy efficient than the high-resolution video capture and recording pipeline, in an example. In addition, the light-weight fusion network is approximately 43.75× more energy efficient than the VIS pipeline. Overall, compared with the record-everything baseline, the disclosed system effectively improves system energy efficiency by 86.36% on average. In an example equipped with 0.36 Wh battery, the disclosed system may be able to support 8 hours of continuous operation after fully charged, which can meet typical daily usage requirement without frequent charging.

Figure 15:
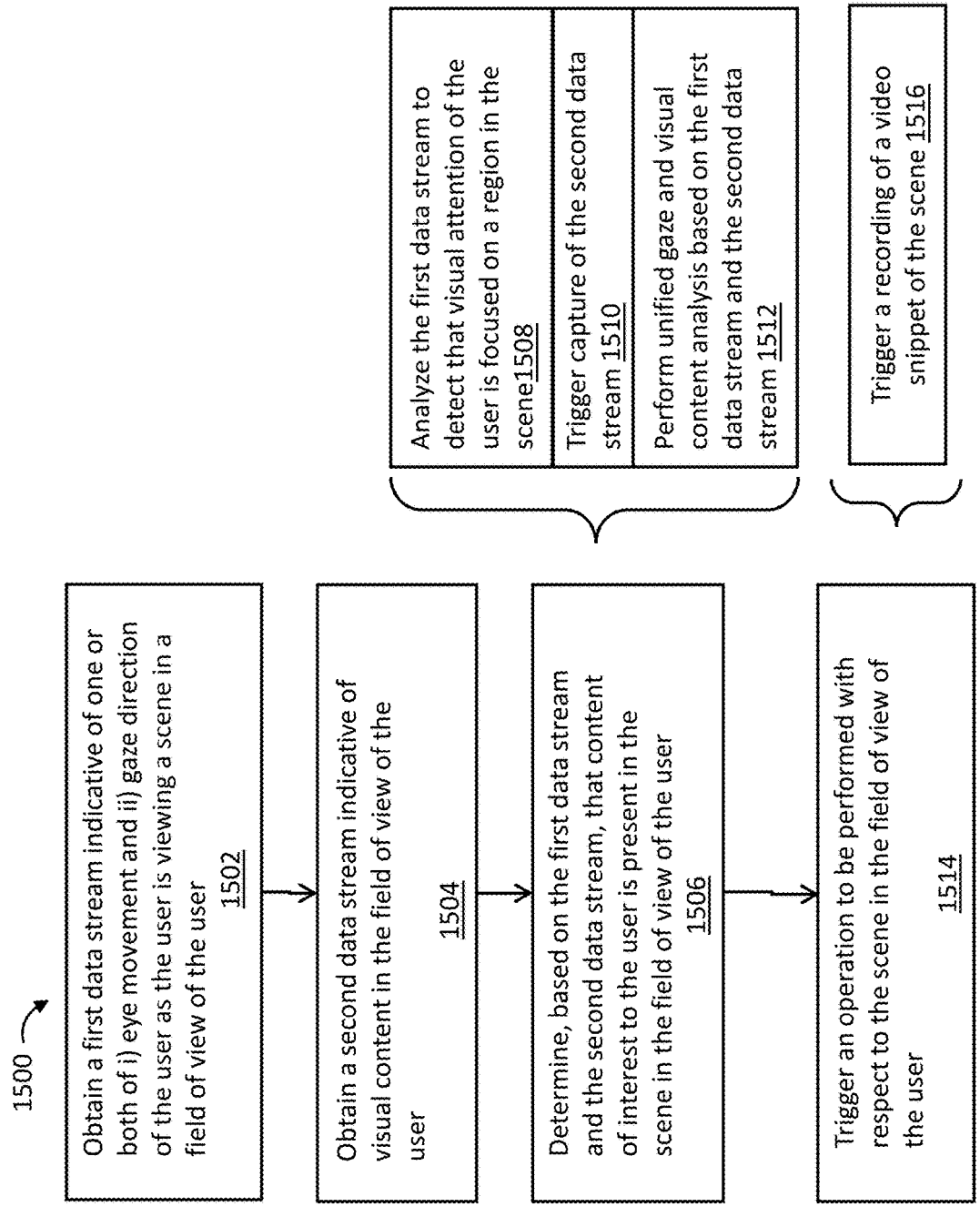
FIG. 15 depicts a method for detecting salient content in field of view of a user in accordance with an example.

FIG. 15 depicts a method 1500 for detecting salient content in field of view of a user in accordance with one example. The method 1500 may be implemented by one or more of the processors described herein. For instance, the method 1500 may be implemented by an image signal processor implementing an image processing system, such as the system 100 of FIG. 1 or the system 300 of FIG. 3. Additional and/or alternative processors may be used. For instance, one or more acts of the method 1500 may be implemented by an application processor, such as a processor configured to execute a computer vision task.

The method 1500 includes an act 1502 in which one or more procedures may be implemented to obtain a first data stream. The first data stream may be indicative of i) eye movement and ii) gaze direction of the user as the user is viewing a scene in a field of view of the user. The first data stream may include image data that may be obtained from a sensor, such as a camera, for example. The first data stream may include, for example, a plurality of video frames depicting an eye gaze of the user as the user is viewing a scene in a field of view of the user. The first image steam may be obtained from a first sensor, such as an inward-facing camera that may be attached to a smart eyewear frame worn by a user or other suitable sensor. In an example, the first data stream is obtained from the first sensor 102 of FIG. 1.

At an act 1504, one or more procedures may be implemented to obtain a second data stream. The second data stream may be indicative of visual content in the field of view of the user. The second data stream may include one or more images or video frames capturing visual content in the field of view of the user, for example. The second data steam may be obtained from a second sensor, such as a forward-facing camera that may be attached to the smart eyewear frame worn by the user. In an example, the second data stream may be obtained from the second sensor 104 of FIG. 1.

At an act 1506, the first data stream obtained at the act 1502 and the second data stream obtained at the act 1504 may be processed to determine that content of interest to the user is present in the scene in the field of view of the user. Determining that content of interest to the user is present in the scene may comprise, for example, detecting that visual attention of the user is directed to an object within the scene. In an example, processing at act 1506 may include an act 1508 in which the first data stream is processed to detect that visual attention of the user is focused on a region in the scene. Then, capture of the second data stream may be triggered at an act 1510 in response to detecting attention of the user based on processing the first data stream. Processing at the act 1506 may further include an act 1512 in which unified gaze and visual content analysis is performed based on the first data stream and the second data stream. In an aspect, the unified gaze and visual content analysis at the act 1512 is performed by a temporal visual analysis network, such as the TVA network 302 of FIG. 3. In other aspects, other suitable unified analysis techniques and architectures may be utilized.

In some aspects, the unified gaze and visual content analysis at the act 1512 includes extracting a set of gaze features from the first data stream, and, concurrently with extracting the set of gaze features from the first data stream, extracting a set of scene features from the second data stream. The set of gaze features may then be fused with the set of scene features to generate a fused set of features. It may then be detected, based on the fused set of features, that content of interest to the user is present in the scene in the field of view of the user.

In some aspects, the unified gaze and visual content analysis at the act 1512 may further include extracting, from the first data stream, a likelihood of historical eye movement types, and detecting a saccade-smooth pursuit transition in the gaze of the user based at least in part on the likelihood of eye movement types. The unified gaze and visual content analysis at the act 1512 may also include extracting historical gaze positions from the set of gaze features, and detecting the saccade-smooth pursuit transition in the gaze of the user further based on determining that a majority of the historical gaze positions fall within a particular region in the scene. In an example, detecting the saccade-smooth pursuit transition in the gaze of the user may include detecting the saccade-smooth pursuit transition for a pre-determined period of time prior to triggering capture of the second data stream to capture visual content in the field of view of the user.

At an act 1514, in response to determining at block 1506 that content of interest to the user is present in the scene in the field of view of the user, an operation to be performed with respect to the scene in the field of view of the user may be triggered. The act 1514 may include, for example, act 1516 at which recording of a video snippet of the scene in the field of view of the user. The recorded video snippet may be saved in a memory and may be subsequently available for viewing by the user, for example in a personal interest aware visual moment auto-capture application. As another example, act 1514 may include triggering generation of content of interest to the user, for example to be displayed to the user in an augmented reality or a virtual reality application. In other examples, other operations, suitable for other scenarios and/or applications, may be triggered at act 1514.

In examples, a system consistent with the method 1500 may thus implement a biologically-inspired attention-aware eyewear system to capture human visual attention on the fly, analyze the salient visual content, and record moments of personal interest in the form of compact video snippets. Such accurate attentive scene detection and analysis may be suitable for resource-constrained platforms in which ability to perform computation and energy intensive image capture and processing tasks may be limited. By unifying human visual attention tracking and salient visual content analysis, energy requirements of the system may be reduced while still maintaining accuracy of human attention detection. For example, attention tracking may focus computation-intensive video analysis on salient regions, while video analysis may make human attention detection and tracking more accurate. The system may significantly improve the attention tracking accuracy over the eye-tracking-alone method, while maintaining high system energy efficiency.

The term "about" is used herein in a manner to include deviations from a specified value that would be understood by one of ordinary skill in the art to effectively be the same as the specified value due to, for instance, the absence of appreciable, detectable, or otherwise effective difference in operation, outcome, characteristic, or other aspect of the disclosed methods and devices.

The present disclosure has been described with reference to specific examples that are intended to be illustrative only and not to be limiting of the disclosure. Changes, additions and/or deletions may be made to the examples without departing from the spirit and scope of the disclosure.

The foregoing description is given for clearness of understanding only, and no unnecessary limitations should be understood therefrom.

What is claimed is:

1. A method for detecting content of interest to a user, the method comprising:
   obtaining, by a processor, a first data stream indicative of one or both of i) eye movement and ii) gaze direction of the user as the user is viewing a scene in a field of view of the user;
   obtaining, by the processor, a second data stream indicative of visual content in the field of view of the user;
   determining, by the processor, based on the first data stream and the second data stream, i) whether the user is paying attention to the scene in the field of view of the user, including generating a decision indicating whether or not the user is paying attention to the scene in the field of view of the user and ii) a region to which the user is paying attention within the scene, wherein determining whether the user is paying attention to the scene includes:
   extracting a set of gaze features from the first data stream,
   concurrently with extracting the set of gaze features from the first data stream, extracting a set of scene features from the second data stream,
   fusing the set of gaze features with the set of scene features to generate a fused set of features, and
   detecting, based on the fused set of features, that the user is paying attention to the scene in the field of view of the user; and
   in response to determining that the user is paying attention to the scene, triggering, with the processor, an operation to be performed with respect to the region to which the user is paying attention within the scene.

2. The method of claim 1, further comprising:
   analyzing, by the processor, the first data stream prior to obtaining the second data stream;
   based on analyzing the first data stream, detecting, by the processor, that visual attention of the user is focused on the region within the scene; and
   in response to detecting that visual attention of the user is focused on the region within the scene, triggering capture of the second data stream to capture visual content in the field of view of the user.

3. The method of claim 2, wherein analyzing the first data stream includes detecting a change in eye movement of the user as the user is viewing the scene, wherein the change in eye movement indicates that the visual attention of the user is focused on the region within the scene.

4. The method of claim 3, wherein detecting the change in the eye movement of the user as the user is viewing the scene comprises detecting saccade to smooth pursuit transitions in eye gaze of the user.

5. The method of claim 1, wherein determining whether the user is paying attention to the scene in the field of view of the user includes performing a unified analysis of the first data stream and the second data stream by a temporal visual analysis network.

6. The method of claim 1, further comprising:
extracting, by the processor, from the first data stream, a likelihood of historical eye movement types, and
detecting a saccade-smooth pursuit transition in eye gaze of the user based at least in part on the likelihood of eye movement types.

7. The method of claim 6, further comprising:
extracting, by the processor, historical gaze positions from the set of gaze features, and
detecting the saccade-smooth pursuit transition in the eye gaze of the user further based on determining that a majority of the historical gaze positions fall within a region in the scene.

8. The method of claim 6, further comprising, in response to detecting the saccade-smooth pursuit transition, triggering, with the processor, capture of the second data stream to capture visual content in the field of view of the user.

9. The method of claim 8, wherein detecting the saccade-smooth pursuit transition in the eye gaze of the user comprising detecting the saccade-smooth pursuit transition for a pre-determined period of time prior to triggering capture of the second data stream to capture visual content in the field of view of the user.

10. The method of claim 1, wherein determining whether the user is paying attention to content in the scene includes determining that visual attention of the user is directed to an object in the scene.

11. The method of claim 1, wherein triggering the operation to be performed with respect to the region within the scene that has captured attention the user comprises triggering recording of a video snippet capturing the scene in the field of view of the user.

12. The method of claim 11, wherein triggering recording of the video snippet capturing the scene in the field of view of the user comprises triggering the recording to be performed for a predetermined duration of time.

13. A method for tracking visual attention of a user, the method comprising:
obtaining, by a processor, a first data stream indicative of one or both of i) eye movement and ii) gaze direction of the user as the user is viewing a scene in a field of view of the user;
obtaining, by the processor, a second data stream indicative of visual content in the field of view of the user;
using a unified neural network to detect, by the processor, based on the first data stream and the second data stream, i) whether the user is paying attention to the scene in the field of view of the user, including generating a decision indicating whether or not the user is paying attention to the scene and ii) a region to which the user is paying attention within the scene, wherein using the unified neural network to detect whether the user is paying attention to the scene includes:
extracting a set of gaze features from the first data stream,
concurrently with extracting the set of gaze features from the first data stream, extracting a set of scene features from the second data stream,
fusing the set of gaze features with the set of scene features to generate a fused set of features, and
detecting, based on the fused set of features, that the user is paying attention to the scene in the field of view of the user; and
in response to determining that the user is paying attention to the scene, triggering recording of a video snippet capturing the region to which the user is paying attention within the scene.

14. The method of claim 13, further comprising:
analyzing, by the processor, the first data stream prior to obtaining the second data stream;
based on analyzing the first data stream, detecting, by the processor, that visual attention of the user is focused on the region within the scene; and
in response to detecting that visual attention of the user is focused on the region within the scene, triggering capture of the second data stream to capture visual content in the field of view of the user.

15. A system comprising:
a first sensor configured to generate data indicative of one or both of i) eye movement and ii) gaze direction of a user as the user is viewing a scene in a field of view of the user;
a second sensor configured to generate data indicative of visual content in the field of view of the user; and
a processor configured to:
obtain, from the first sensor, a first data stream indicative of the one or both of i) eye movement and ii) gaze direction of the user as the user is viewing the scene,
obtain, from the second sensor, a second data stream indicative of visual content in the field of view of the user,
based on analyzing the first data stream and the second data stream, i) determine whether the user is paying attention to the scene in the field of view of the user, wherein the processor is configured to generate a decision indicating whether or not the user is paying attention to the scene, and ii) determine a region to which the user is paying attention within the scene, the processor being configured to:
extract a set of gaze features from the first data stream,
concurrently with extracting the set of gaze features from the first data stream, extract a set of scene features from the second data stream,
fuse the set of gaze features with the set of scene features to generate a fused set of features, and
detect, based on the fused set of features, that content of interest to the user is present in the scene in the field of view of the user; and
in response to determining that the user is paying attention to the scene, triggering, with the processor, an operation to be performed with respect to the region to which the user is paying attention within the scene.

16. The system of claim 15, wherein the first sensor and second sensor are mounted to a frame of smart eyewear to be worn by the user.

17. The system of claim 16, wherein:
the first sensor is configured as an inward-facing camera facing eyes of the user when the user wears the smart eyewear, and
the second sensor is configured as a forwarding-facing camera with respect to the field of view of the user when the user wears the smart eyewear.

18. The system of claim 17, a first resolution of the inward-facing camera is lower than a second resolution of the forwarding-facing camera.

19. The system of claim 15, wherein the processor is further configured to:
- prior to obtaining the second data stream, analyze the first data stream, obtained from the first sensor,
- based on analyzing the first data stream, detect that visual attention of the user is focused on the region within the scene, and
- in response to detecting that visual attention of the user is focused on the region within the scene, trigger capture of the second data stream to capture visual content in the field of view of the user.

\* \* \* \* \*